United States Patent
Roskoss

(10) Patent No.: US 12,504,167 B2
(45) Date of Patent: Dec. 23, 2025

(54) SYSTEMS AND METHODS FOR FLARE CONTROL

(71) Applicant: Sensia Netherlands B.V., Rotterdam (NL)

(72) Inventor: Alexander Harry Roskoss, York (GB)

(73) Assignee: Sensia Netherlands B.V., Rotterdam (NL)

( * ) Notice: Subject to any disclaimer, the term of this patent is extended or adjusted under 35 U.S.C. 154(b) by 0 days.

(21) Appl. No.: 18/797,214

(22) Filed: Aug. 7, 2024

(65) Prior Publication Data

US 2025/0052421 A1   Feb. 13, 2025

Related U.S. Application Data

(60) Provisional application No. 63/531,391, filed on Aug. 8, 2023.

(51) Int. Cl.
*F23G 7/08* (2006.01)

(52) U.S. Cl.
CPC ............ *F23G 7/08* (2013.01); *F23G 2207/10* (2013.01); *F23G 2900/55* (2013.01)

(58) Field of Classification Search
CPC ..... F23G 7/08; F23G 2207/10; F23G 2900/55
See application file for complete search history.

(56) References Cited

U.S. PATENT DOCUMENTS

2015/0293506 A1 * 10/2015 Mohideen ............ G05B 13/048
                                                                700/282
2022/0179399 A1    6/2022 Hajizadeh et al.

OTHER PUBLICATIONS

Zeng, Yousheng, Jon Morris, and Mark Dombrowski. "Validation of a new method for measuring and continuously monitoring the efficiency of industrial flares." Journal of the Air & Waste Management Association 66.1 (2016): 76-86. (Year: 2016).*
International Search Report and Written Opinion on International Application No. PCT/IB2024/057665 dated Nov. 25, 2024.

* cited by examiner

*Primary Examiner* — Robert J Eom
(74) *Attorney, Agent, or Firm* — Foley & Lardner LLP

(57) ABSTRACT

A method for operating a flare includes obtaining sensor data associated with emissions of the flare from sensors of a sensing unit associated with the flare. The method also includes determining, based on the sensor data, one or more control decisions for at least one controllable element associated with the flare to achieve a control objective for the flare. The control objective is associated with the emissions of the flare. The method also includes generating display data corresponding to the one or more control decisions. The method also includes operating a display device to provide the display data to a user.

20 Claims, 9 Drawing Sheets

SYSTEMS AND METHODS FOR FLARE CONTROL

CROSS-REFERENCE TO RELATED PATENT APPLICATION

This application claims the benefit of and priority to U.S. Provisional Patent Application No. 63/531,391, filed Aug. 8, 2023, which is incorporated herein by reference in its entireties.

BACKGROUND

The present disclosure relates generally to systems that monitor and optimize emission costs including but not limited to pollution, carbon, greenhouse gasses, and other emissions. In recent years, regulators have started to levy carbon taxes on carbon emissions. For example, large businesses in the United Kingdom are required to pay a set amount for a volume of carbon emissions. Schemes for trading greenhouse gasses rely on the "cap and trade" principle, where a cap is set on the total amount of emissions a sector can emit. Optimizing carbon emission costs is an important first step to managing the level of emissions and reducing costs for a company. A hydrocarbon site such as a well site can produce emissions. One type of hydrocarbon site is a natural gas site that produces or transports natural gas. Such sites can include a flare for burning off harmful emissions such as methane. An operator of a hydrocarbon site may monitor emission costs of the flare through a measurement from a sensor. The measurements from the sensor may allow for the operator to determine past emission costs of the flare and/or a live emission cost rate of the flare. However, the operator may not be able to determine the emission costs of the flare with sufficient accuracy and/or may not be able to determine the emission costs of the flare over a future time frame using the measurements from the sensor. Furthermore, the operator may not be able to optimize the operation of the flare to optimize the emission costs of the flare over the future time frame. Therefore, it would be advantageous to provide a system or a method that determines the emission costs of the flare over the future time frame.

SUMMARY OF THE INVENTION

One implementation of the present disclosure is a method for operating a flare, according to some embodiments. The method includes obtaining sensor data associated with emissions of the flare from sensors of a sensing unit associated with the flare. The method also includes determining, based on the sensor data, one or more control decisions for at least one controllable element associated with the flare to achieve a control objective for the flare. The control objective are associated with the emissions of the flare. The method also includes generating display data corresponding to the one or more control decisions. The method also includes operating a display device to provide the display data to a user.

In some embodiments, the method also includes operating the at least one controllable element associated with the flare according to the one or more control decisions to meet the control objective. In some embodiments, the control objective is associated with an emission threshold of the emissions of the flare. In some embodiments, the at least one controllable element is operated such that the emissions of the flare do not exceed the emission threshold.

In some embodiments, the control objective is associated with a future emission threshold of the emissions of the flare over a future time frame. In some embodiments, the at least one controllable element is operated according to the one or more control decisions during the future time frame such that the emissions of the flare over the future time frame do not exceed the future emission threshold.

In some embodiments, the one or more control decisions are determined by obtaining, from an operator of the flare, the control objective associated with the emissions of the flare, obtaining an objective function that quantifies a performance variable as a function of control decisions for controllable elements associated with the flare, the objective function subject to the control objective, and determining, by minimizing or maximizing the performance variable of the objective function, the one or more control decisions for the at least one controllable element of the flare.

In some embodiments, the objective function for the flare is generated by inputting the sensor data and the control objective into a model of the flare. In some embodiments, the performance variable corresponds to emission cost measurement associated with the emissions of the flare. In some embodiments, the one or more control decisions are determined by minimizing the performance variable corresponding to the emission cost measurement.

In some embodiments, the control objective is associated with the emissions of the flare over a future time frame. In some embodiments, the objective function quantifies the performance variable as the function of the control decisions for the controllable elements associated with the flare over the future time frame. In some embodiments, the control objective is associated with a future emission threshold of the emissions of the flare over a future time frame.

In some embodiments, the method also includes operating the at least one controllable element of the flare according to the one or more control decisions over the future time frame such that the emissions of the flare over the future time frame do not exceed the future emission threshold.

In some embodiments, the flare is a first flare. In some embodiments, the one or more control decisions are for at least one controllable element associated with the first flare and a second flare. In some embodiments, the one or more control decisions including directing a first quantity of an added material to the first flare and a second quantity of the added material to the second flare to achieve a combined control objective for the first flare and the second flare.

Another implementation of the present disclosure is a computing system configured to communicatively couple with a remote terminal unit (RTU) configured to monitor and/or control one or more operations of a flare associated with a hydrocarbon site, according to some embodiments. The computing system includes a processor. The processor is configured to obtain, from the RTU, sensor data associated with emissions of the flare from sensors of a sensing unit associated with the flare. The processor is also configured to determine, based on the sensor data, one or more control decisions for at least one controllable element associated with the flare to achieve a control objective for the flare. The control objective is associated with the emissions of the flare. The processor is also configured to generate display data corresponding to the one or more control decisions. The processor is also configured to operate a display device to provide the display data to a user.

In some embodiments, the processor is further configured to operate the at least one controllable element associated with the flare according to the one or more control decisions to meet the control objective. In some embodiments, the control objective is associated with a future emission threshold of the emissions of the flare over a future time frame. In some embodiments, the one or more control decisions will result in operation of the at least one controllable element during the future time frame such that the emissions of the flare over the future time frame do not exceed the future emission threshold.

In some embodiments, the control objective is associated with an emission threshold of the emissions of the flare. In some embodiments, the one or more control decisions will result in operation of the at least one controllable element such that the emissions of the flare do not exceed the emission threshold.

In some embodiments, the one or more control decisions are determined by obtaining, from an operator of the flare, the control objective associated with the emissions of the flare, obtaining an objective function that quantifies a performance variable as a function of control decisions for controllable elements associated with the flare, the objective function subject to the control objective, and determining, by minimizing or maximizing the performance variable of the objective function, the one or more control decisions for the at least one controllable element of the flare.

In some embodiments, the control objective is associated with the emissions of the flare over a future time frame. In some embodiments, the objective function quantifies the performance variable as the function of the control decisions for the controllable elements associated with the flare over the future time frame. In some embodiments, the control objective is associated with a future emission threshold of the emissions of the flare over a future time frame. In some embodiments, the processor is also configured to operate the at least one controllable element of the flare according to the one or more control decisions over the future time frame such that the emissions of the flare over the future time frame do not exceed the future emission threshold.

Yet another implementation of the present disclosure is a hydrocarbon system, according to some embodiments. The hydrocarbon system includes a first flare, a second flare, and a processor. The processor is configured to obtain sensor data associated with first emissions of the first flare and second emissions of the second flare from sensors of sensing units associated with the first flare and the second flare. The processor is also configured to determine, based on the sensor data, one or more control decisions for at least one controllable element associated with the first flare or the second flare to achieve a control objective for the first flare and the second flare. The control objective is associated with the first emissions and the second emissions. The processor is also configured to generate display data corresponding to the one or more control decisions. The processor is also configured to operate a display device to provide the display data to a user.

In some embodiments, the processor is also configured to operate the at least one controllable element according to one or more control decisions to direct a first quantity of measured material to the first flare and a second quantity of measured material to the second flare. In some embodiments, the one or more control decisions include increasing a first portion of a measured material directed to the first flare and decreasing a second portion of the measured material directed to the second flare.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
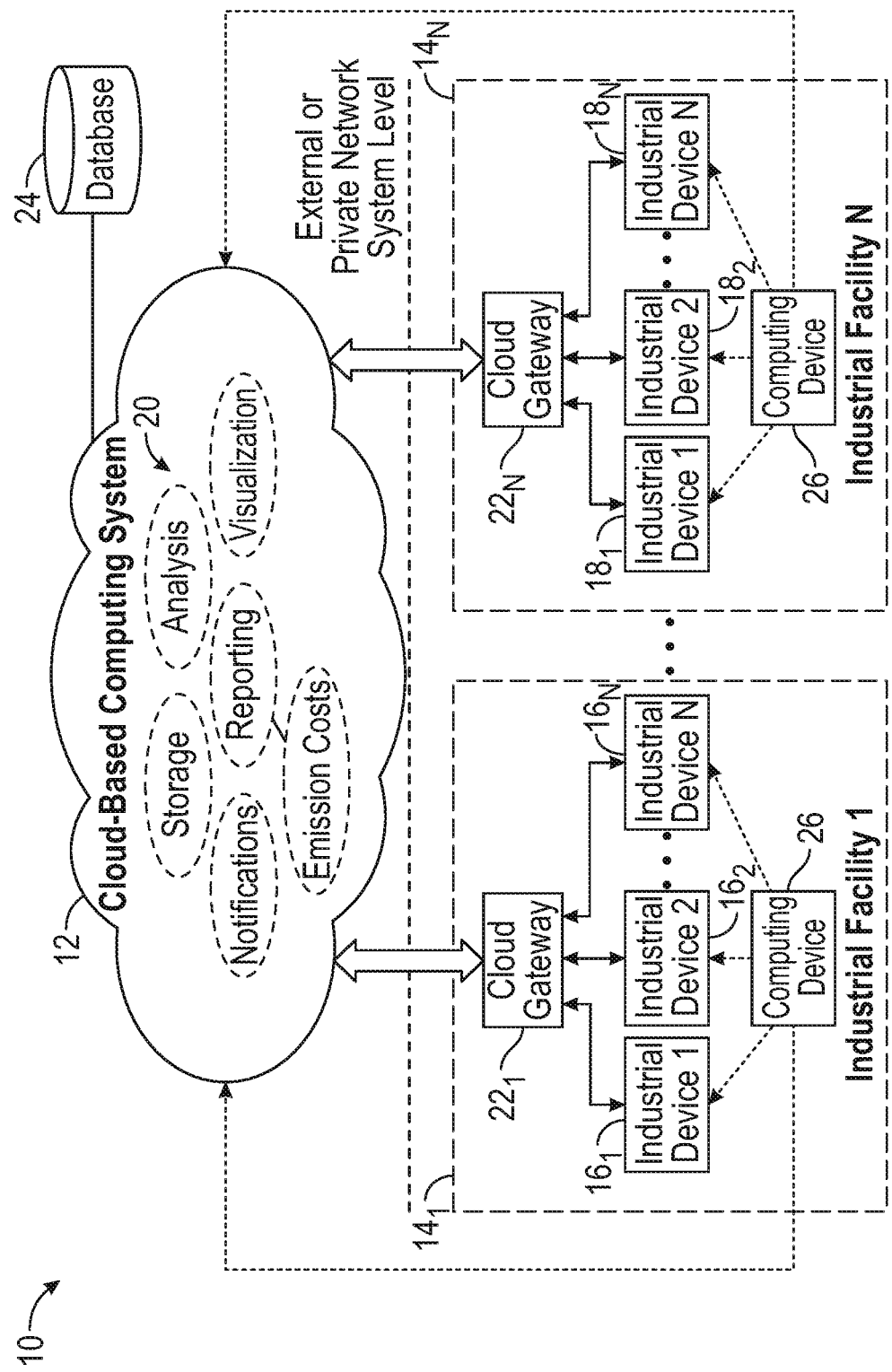
FIG. 1 illustrates a block diagram of a high-level overview of an industrial enterprise including a cloud-based computing system, in accordance with some embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another.

Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed towards improved systems and methods for monitoring of emissions (e.g., carbon dioxide emissions, green house gas emissions, etc.) and/or emission costs (e.g., carbon dioxide emission costs, greenhouse gas emission costs, etc.). The systems and methods advantageously provide a dynamic combination of metering data, flare modeling, emissions calculations, and optimization of a flare (e.g., a flare boom, a flare stack, etc.) to reduce emissions emitted by the flare and/or emission costs (e.g., the cost per quantity of emissions, etc.) associated with the emissions emitted by the flare, in some embodiments. Additionally, the modeling of the flare may advantageously reduce an uncertainty in values of the emission costs associated with the emissions emitted by the flare. In some embodiments, emission costs associated with the emissions emitted by the flare and/or emission cost rates associated with the emissions emitted by the flare are provided in a live manner (e.g., real time or near real time fashion, a live emission cost rate, a live emission cost, etc.). In some embodiments, emission costs associated with emissions emitted by the flare are forecasted over a future time frame. Although embodiments are described herein with respect to natural gas production and transportation, the systems and method disclosed herein can be used with other applications (chemical, manufacturing, mining, agricultural, transportation, etc.) Metering data can be provided by meters and analyzers associated with the flare. In some embodiments, a combination of live measurement data, flare modeling, and optimization analysis are used to provide control decisions to controllable flare elements (e.g., valves, pumps, compressors, etc.) configured to control operation of the flares.

Provision of live emission cost rates associated with the emissions emitted by the flares through electronic computation can be achieved with a suitably configured device physically close to the metering devices and/or through processing of data relevant to the flow measurement, analysis, and optimization which has been passed to a system remote from the flare, in some embodiments. Moreover, embodiments of the present disclosure are related to leveraging a cloud-based computing network to perform various operations more efficiently. For example, a controller physically close to the metering devices may perform processing and analysis of data and a cloud-based computing network may perform optimization on processed and analyzed data received from the controller.

In some embodiments, information related to weather, related to a gas combusted by the flare (e.g., a waste gas, a fuel gas, etc.), and/or related to the flare equipment may be gathered at the flare or at various locations of the hydrocarbon well site. This information or data may be used to determine the emissions (e.g., carbon dioxide emissions, methane emissions, etc.) emitted by the flare. In some embodiments, the information or data may be used to determine the emission costs associated with the emissions emitted by the flare. The data related to the flares may be acquired using monitoring devices that may include sensors configured to acquire the data and transmitters configured to transmit the data to computing devices, routers, other monitoring devices, and the like, such that well site personnel and/or off-site personnel may view and analyze the data. The data related to the flares may be inputted into a model of the flare (e.g., a computer model of the combustion of the flare, an equation model of the combustion of the flare, etc.) to determine an emission cost of the emissions emitted by the flare and/or an emission cost rate of the emissions emitted by the flare. In addition to monitoring the properties of the flares and the hydrocarbon well site, the monitoring devices, such as remote terminal units (RTUs), may control the operations of the controllable flare elements (e.g., valves, pumps, compressors, burners, igniters, etc.) configured to control various operations of the flares. Generally, the RTUs store and execute control programs and monitoring programs to effect decision-making in connection with a process for controlling the controllable flare elements to control the various operations of the flares. The decisions making of the RTUs regarding the control of the controllable flare elements can be in response to emissions data associated with the flares and/or in response to emission costs associated with the flares. In some embodiments, the decision making can be in response to emission rates of the flares and/or in response to emission cost rates of the flares.

In some embodiments, data related to forecasts of the weather over a future time frame or related to forecasts of the waste gas produced by the hydrocarbon site over the future time frame may be gathered. This forecasted information or data may be used to determine forecasted emission costs over the future time frame. The data related to the forecasts of the weather over the future time frame may be acquired from a weather forecasting service. The data related to the forecasts of the waste gas produced by the hydrocarbon site may be acquired from a production forecast of the hydrocarbon site (e.g., the estimated production for the hydrocarbon site over the future time frame, the projected production for the hydrocarbon site over the future time frame, etc.). For example, the data related to the forecasts of the waste gas produced by the hydrocarbon side may be acquired by forecasting amounts and classifications of material that will be processed by the hydrocarbon side over the future time frame. The data related to the forecasts of the weather and/or the forecasts of the waste gas produced by the hydrocarbon site may be inputted into a model of the flare to determine a forecasted emission cost of the emissions that are predicted to be emitted by the flare over the future time frame. An optimizer (e.g., an optimizer module, a flare optimizer, etc.) may take a set of outputs from the model of the flare and determine an optimal operation of the flare that minimizes the emissions emitted by the flare and/or the emission costs associated with the emissions emitted by the flare over the future time frame. The optimizer may provide the optimal operation of the flare to an operator of the flare and/or to a control system associated with the flare (e.g., to the RTUs, etc.) in order to optimally operate the flare to minimize the emissions emitted by the flare and/or the emission costs associated with the emissions emitted by the flare. In some embodiments, the optimizer may take a set of outputs from multiple models of multiple flares and determine an optimal operation of the multiple of the flares that minimizes the emission costs of the emissions emitted by the multiple of the flares and/or emission cost rates associated with the emissions emitted by the multiple of the flares over the future time frame.

In some embodiments, the systems and methods are configured for increased data integrity (e.g., reduced data uncertainty, etc.), reduced manual intervention, increased automation, and/or reduced emission costs. In some embodiments, the systems and methods provide a graphical display of emission costs associated with emissions emitted by a flare and control decisions associated with emission cost optimization of the emission costs. In some embodiments, the systems and methods track emission costs associated with emissions emitted by a flare against consents and/or against carbon credits. Reports of emission costs associated with emissions emitted by the flare and/or total emission costs associated with total emissions emitted by multiple of the flares can be provided.

In some embodiments, the optimization of emission costs may reduce the emission costs related to the flare. Optimizing the emission costs of flaring systems on a future basis provides the opportunity for running the flaring system during portions of the future time frame that may result in lower emission costs.

Cloud-Based Computing System

By way of introduction, FIG. 1 illustrates a high-level overview of an industrial enterprise such as a hydrocarbon site 10 that leverages a cloud-based computing system to improve the operations of various industrial devices. The enterprise or hydrocarbon site 10 may include one or more industrial facilities 14, each having a number of industrial devices 16 and 18 in use. The industrial devices 16 and 18 may make up one or more automation systems operating within the respective facilities 14. Exemplary automation systems may include, but are not limited to, batch control systems (e.g., mixing systems), continuous control systems (e.g., proportional-integral-derivative (PID) control systems), or discrete control systems. Industrial devices 16 and 18 may include devices, such as industrial controllers (e.g., programmable logic controllers or other types of programmable automation controllers), field devices such as sensors and meters, motor drives, operator interfaces (e.g., human-machine interfaces, industrial monitors, graphic terminals, message displays, etc.), industrial robots, barcode markers and readers, vision system devices (e.g., vision cameras), smart welders, or other such industrial devices.

In certain embodiments, the industrial devices 16 and 18 may communicatively couple to a computing device 26. The communication link between the industrial devices 16 and 18 and the computing device 26 may be a wired or a wireless connection, such as Wi-Fi®, Bluetooth®, and the like. Generally, the computing device 26 may be any type of processing device that may include communication abilities, processing abilities, and the like. For example, the computing device 26 may be a controller, such as a programmable logic controller (PLC), a programmable automation controller (PAC), or any other controller that may monitor, control, and operate the industrial device 16 and 18. The computing device 26 may be incorporated into any physical device (e.g., the industrial device 16 and 18) or may be implemented as a stand-alone computing device (e.g., general purpose computer), such as a desktop computer, a laptop computer, a tablet computer, a mobile computing device, or the like.

In addition to communicating with the industrial devices 16 and 18, the computing device 26 may establish a communication link (e.g., a wired communication link, a wireless communication link, etc.) with the cloud-based computing system 12. As such, the computing system 26 may have access to a number of cloud-based services provided by the cloud-based computing system 12, as will be described in more detail below. Generally, the computing device 26 may send and receive data to and from the cloud-based computing system 12 to assist a user of the industrial device 16 or 18 in the commissioning, operation, and/or maintenance of the industrial automation systems.

Exemplary automation systems can include one or more industrial controllers that facilitate monitoring and control of their respective processes and emissions. The controllers may exchange data with the field devices using native hardwired I/O or via a plant network such as Ethernet/IP, Data Highway Plus, ControlNet, DeviceNet, or the like. A given controller may receive any combination of digital or analog signals from the field devices indicating a current state of the devices, their associated processes, and forecasted process and conditions (e.g., forecasted temperature, forecasted inputs, etc.), and executes a user-defined control program that performs automated decision-making for the controlled processes based on the received signals. The controller may then output appropriate digital and/or analog control signaling to the field devices in accordance with the decisions made by the control program. These outputs may include device actuation signals, temperature or position control signals, operational commands to a machining or material handling robot, mixer control signals, motion control signals, and the like. The control program may include any suitable type of code used to process input signals read into the controller and to control output signals generated by the controller, including but not limited to ladder logic, sequential function charts, function block diagrams, structured text, or other such platforms.

Although the industrial enterprise or hydrocarbon site 10 illustrated in FIG. 1 depicts the industrial devices 16 and 18 as residing in fixed-location industrial facilities 14, the industrial devices 16 and 18 may be part of a mobile control application, such as a system contained in a truck or other service vehicle. Additionally, although the industrial enterprise or hydrocarbon site 10 of FIG. 1 is described with respect to hydrocarbon production well sites, it should be noted that the systems and method for the industrial enterprise or hydrocarbon site 10 described herein may be applied to other automation systems.

In certain embodiments, the industrial devices 16 and 18 may be communicatively coupled to the cloud-based computing system 12 that may provide various applications, analysis operations, and access to data that may be unavailable to the industrial devices 16 and 18. For example, the industrial devices 16 and 18 may produce measurements and uncertainty values associated with the measurements and the cloud-based computing system 12 may analyze the measurements and/or the uncertainty values to determine trends associated with the industrial devices 16 and 18. In some embodiments, the industrial device 16 and 18 may interact with the cloud-based computing system 12, such that the industrial device 16 and 18 may use various cloud-based services 20 to perform its respective operations more efficiently or effectively. The cloud-based computing system 12 may be any infrastructure that enables the cloud-based services 20 to be accessed and utilized by cloud-capable devices. In one embodiment, the cloud-based computing system 12 may include a number of computers that may be connected through a real-time communication network, such as the Internet, Ethernet/IP, ControlNet, or the like. By employing a number of computers, the cloud-based computing system 12 may distribute large-scale analysis operations over the number of computers that make up the cloud-based computing system 12.

Generally, the computers or computing devices provided by the cloud-based computing system 12 may be dedicated to performing various types of complex and time-consuming analysis that may include analyzing a large amount of data. In some embodiments, the computers or computing devices provided by the cloud-based computing system 12 provide emission costs or forecasted emission costs over a future time frame. In some embodiments, the emission reporting can include graphical displays of compliance to flare consents with daily emission costs and/or graphical displays of forecasted flare emission costs. In some embodiments, the emissions reporting includes tracking flare emission costs against consents and emissions against carbon credits. As a result, the industrial device 16 or 18 may continue its respective processing operations without performing additional processing or analysis operations that may involve analyzing large amounts of data collected from other data sources.

In certain embodiments, the cloud-based computing system 12 may be a public cloud accessible via the Internet by devices having Internet connectivity and appropriate authorizations to utilize the cloud-based services 20. In some scenarios, the cloud-based computing system 12 may be a platform-as-a-service (PaaS), and the cloud-based services 20 may reside and execute on the cloud-based computing system 12. In some embodiments, cloud-based computing system—is configured to provide, storage, notifications, reporting, visualization, and analysis of emissions and uncertainty.

Hydrocarbon Site

Figure 2:
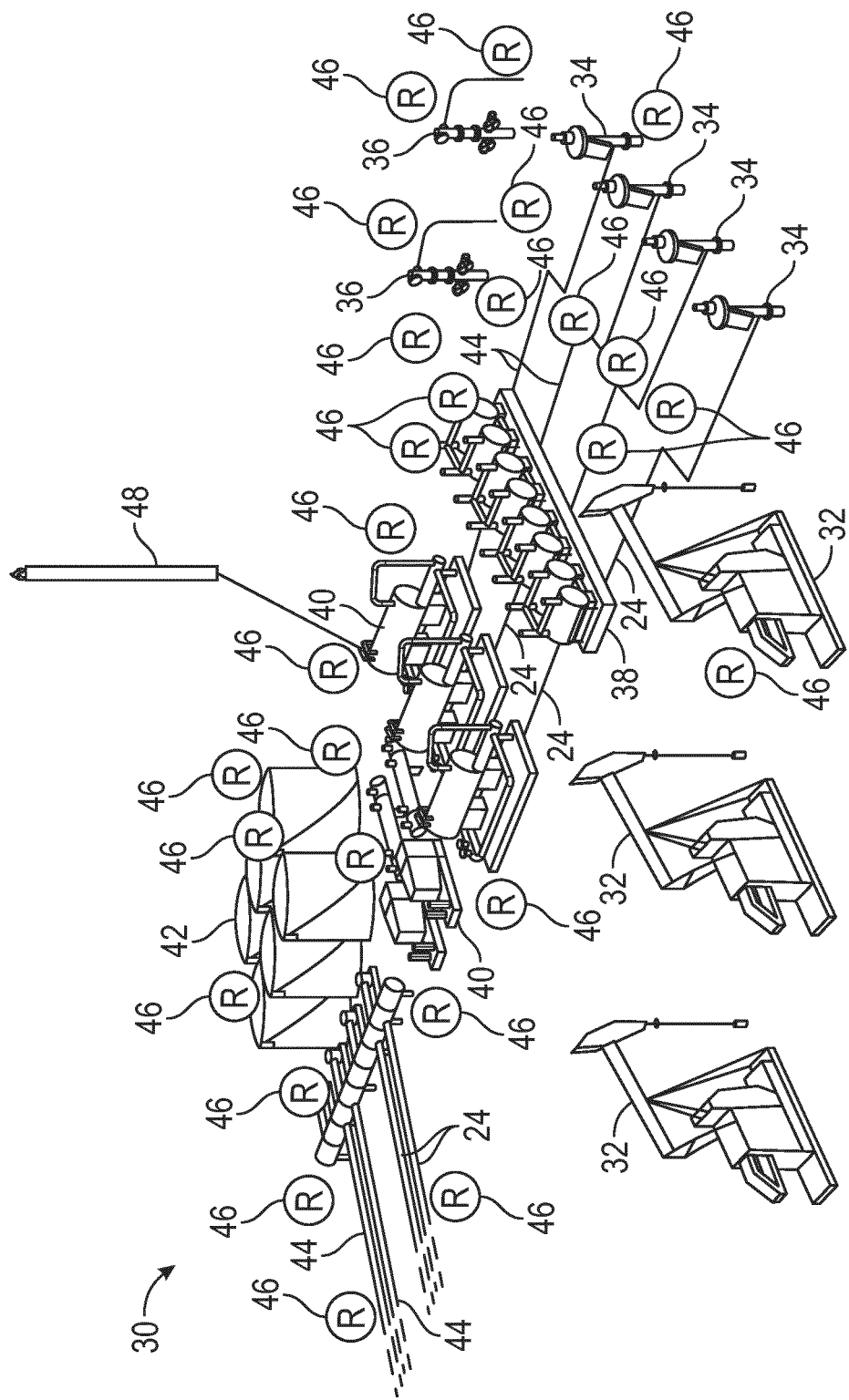
FIG. 2 illustrates a schematic diagram of an example hydrocarbon site that may produce and process hydrocarbons, in accordance with some embodiments presented herein.

Referring now to FIG. 2, the hydrocarbon site 10 can be embodied as hydrocarbon site 30. Hydrocarbon site 30 may be an area in which hydrocarbons, such as crude oil and natural gas, are extracted from the ground, processed, and/or stored, in some embodiments. As such, the hydrocarbon site 30 may include a number of wells (e.g., hydrocarbon wells, oil wells, etc.) and a number of well devices (e.g., pumps, jacks, wellheads, etc.) that may control the flow of hydrocarbons being extracted from the wells. In one embodiment, the well devices at the hydrocarbon site 30 may include any device equipped to monitor and/or control production of hydrocarbons at a well site. As such, the well devices may include pumpjacks 32, submersible pumps 34, well trees 36, and the like. After the hydrocarbons are extracted from the surface via the well devices, the extracted hydrocarbons may be distributed to other devices such as wellhead distribution manifolds 38, separators 40, storage tanks 42, flares 48 and the like. At the hydrocarbon site 30, the pumpjacks 32, submersible pumps 34, well trees 36, wellhead distribution manifolds 38, separators 40, and storage tanks 42 may be connected together via a network of pipelines 44. As such, hydrocarbons extracted from a reservoir may be transported to various locations at the hydrocarbon site 30 via the network of pipelines 44. Conduits used on hydrocarbon site 30 may include flow meters for providing flow measurements.

The pumpjack 32 may mechanically lift hydrocarbons (e.g., oil) out of a well when a bottom hole pressure of the well is not sufficient to extract the hydrocarbons to the surface. The submersible pump 34 may be an assembly that may be submerged in a hydrocarbon liquid that may be pumped (e.g., at a bottom of one of the wells, etc.). As such, the submersible pump 34 may include a hermetically sealed motor, such that liquids may not penetrate the seal into the motor. Further, the hermetically sealed motor may push hydrocarbons from underground areas or the reservoir to the surface.

The well trees 36 or Christmas trees may be an assembly of valves, spools, and fittings used for natural flowing wells. As such, the well trees 36 may be used for an oil well, gas well, water injection well, water disposal well, gas injection well, condensate well, and the like. The wellhead distribution manifolds 38 may collect the hydrocarbons that may have been extracted by the pumpjacks 32, the submersible pumps 34, and the well trees 36, such that the collected hydrocarbons may be routed to various hydrocarbon processing or storage areas in the hydrocarbon site 30.

The separator 40 may include a pressure vessel that may separate well fluids produced from oil and gas wells into separate gas and liquid components. For example, the separator 40 may separate hydrocarbons extracted by the pumpjacks 32, the submersible pumps 34, or the well trees 36 into oil components, gas components, and water components. After the hydrocarbons have been separated, each separated component may be stored in a particular storage tank 42. The hydrocarbons stored in the storage tanks 42 may be transported via the pipelines 44 to transport vehicles, refineries, and the like.

The flare 48 may include a flaring tower that is configured to burn off waste gas produced from oil and gas wells. For example, the flare 48 may burn off natural gas that is unable to be utilized by the hydrocarbon site 30 (e.g., natural gas that cannot be combusted to power the hydrocarbon site 30, natural gas that cannot be stored by the hydrocarbon site 30, etc.) to convert the natural gas into carbon dioxide so that it can be released into the atmosphere. In some embodiments, the flare 48 burns off the gas components separated by the separator 40. In some embodiments, the hydrocarbon site 30 may contain multiple of the flares 48 that are configured to burn different gases and/or different quantities of gases. The flare 48 may include controllable flare elements configured to control the operation of the flare 48. The well devices can include venting mechanisms such as systems for venting natural gas sources.

The well devices may include monitoring systems that may be placed at various locations in the hydrocarbon site 30 to monitor or provide information related to certain aspects of the hydrocarbon site 30. As such, the monitoring system may be a flow meter, temperature sensor, pressure sensor, composition analyzer, density analyzer, controller, a remote terminal unit (RTU), any computing device that may include communication abilities, processing abilities, sensor and the like. For discussion purposes, the monitoring system will be embodied as the RTU 46 throughout the present disclosure. However, it should be understood that the RTU 46 may be any component capable of monitoring and/or controlling various components at the hydrocarbon site 30.

The RTU 46 may include sensors or may be coupled to various sensors that may monitor various properties associated with a component at the hydrocarbon site 10. The RTU 46 may then analyze the various properties associated with the component and may control various operational parameters of the component. For example, the RTU 46 may measure a pressure or a differential pressure of a well or a component (e.g., storage tank 42) in the hydrocarbon site 30. The RTU 46 may measure a temperature of contents stored inside a component in the hydrocarbon site 30, an amount of hydrocarbons being processed or extracted by components in the hydrocarbon site 30, a flow rate of a gas to a component (e.g., flare 48, etc.) and the like. The RTU 46 may measure a level or amount of hydrocarbons stored in a component, such as the storage tank 42. In certain embodiments, the RTU 46 may be iSens-GP Pressure Transmitter, iSens-DP Differential Pressure Transmitter, iSens-MV Multivariable Transmitter, iSens-T2 Temperature Transmitter, iSens-L Level Transmitter, or Isens-IO Flexible I/O Transmitter manufactured by vMonitor® of Houston, Texas.

In one embodiment, the RTU 46 may include a sensor that may measure pressure, temperature, fill level, flow rates, fluid composition, and the like. The RTU 46 may include a transmitter, such as a radio wave transmitter, that may transmit data acquired by the sensor via an antenna or the like. The sensor in the RTU 46 may be wireless sensors that may be capable of receive and sending data signals between computing systems 26 (e.g., between the RTUs 46). To power the sensors and the transmitters, the RTU 46 may include a battery or may be coupled to a continuous power supply. Since the RTU 46 may be installed in harsh outdoor and/or explosion-hazardous environments, the RTU 46 may be enclosed in an explosion-proof container that may meet certain standards established by the National Electrical Manufacturer Association (NEMA) and the like, such as a NEMA 4X container, a NEMA 7X container, and the like.

The RTU 46 may transmit data acquired by the sensor or data processed by a processor to other monitoring systems, a router device, a supervisory control and data acquisition (SCADA) device, or the like. As such, the RTU 46 may enable users to monitor various properties of various components in the hydrocarbon site 30 without being physically located near the corresponding components.

In operation, the RTU 46 may receive real-time or near real-time data associated with the flare 48. The data may include, for example, a flow rate of a waste gas provided to the flare 48, a pressure inside of the flare 48, a pressure of a gas received by the flare 48, a flow rate of steam to the flare 48, a temperature inside the flare 48, a temperature of the waste gas provided to the flare 48, a flame height of a flame of the flare 48, a composition of the waste gas provided to the flare 48, a methane content of the air proximate the flare 48, a composition of the gas produced by the flare 48, and the like. In any case, the RTU 46 may analyze the real-time data with respect to static data that may be stored in a memory of the RTU 46. The static data may include a flare height associated with flare 48 (e.g., a height of a nozzle of the flare 48, etc.), a nozzle diameter of a nozzle of the flare 48, a tubing size of tubing of the flare 48, a storage tank volume of a storage tank of and/or associated with the flare 48, a maximum flow rate through the flare 48, a gas temperature of gas provided to the flare 48, flare test data associated with the flare 48 (e.g., results from tests that were performed on the flare 48, results from tests that are associated with the flare 48, etc.), fluid properties of the hydrocarbons being extracted in the hydrocarbon site 30, and the like. The RTU 46 may analyze the real-time data with respect to other data acquired by various types of instruments (e.g., weather sensor, water cut meter, multiphase meter, etc.) to determine an inflow performance relationship (IPR) curve associated with the flare 48, a desired operating point for the flare 48 and/or hydrocarbon site 30, key performance indicators (KPIs) associated with the flare 48 and/or hydrocarbon site 30, flare performance summary reports associated with the flare 48, and the like. Although the RTU 46 may be capable of performing the above-referenced analyses, the RTU 46 may not be capable of performing the analyses in a timely manner.

In some embodiments, the RTU 46 may establish a communication link with the cloud-based computing system 12 described above. As such, the cloud-based computing system 12 may use its larger processing capabilities to analyze data acquired by multiple computing systems 26 (e.g., RTUs). Moreover, the cloud-based computing system 12 may access historical data associated with the respective RTU 46, data associated with well devices associated with the respective RTU 46, data associated with the hydrocarbon site 30 associated with the respective RTU 46 and the like to further analyze the data acquired by the RTU 46.

Figure 3:
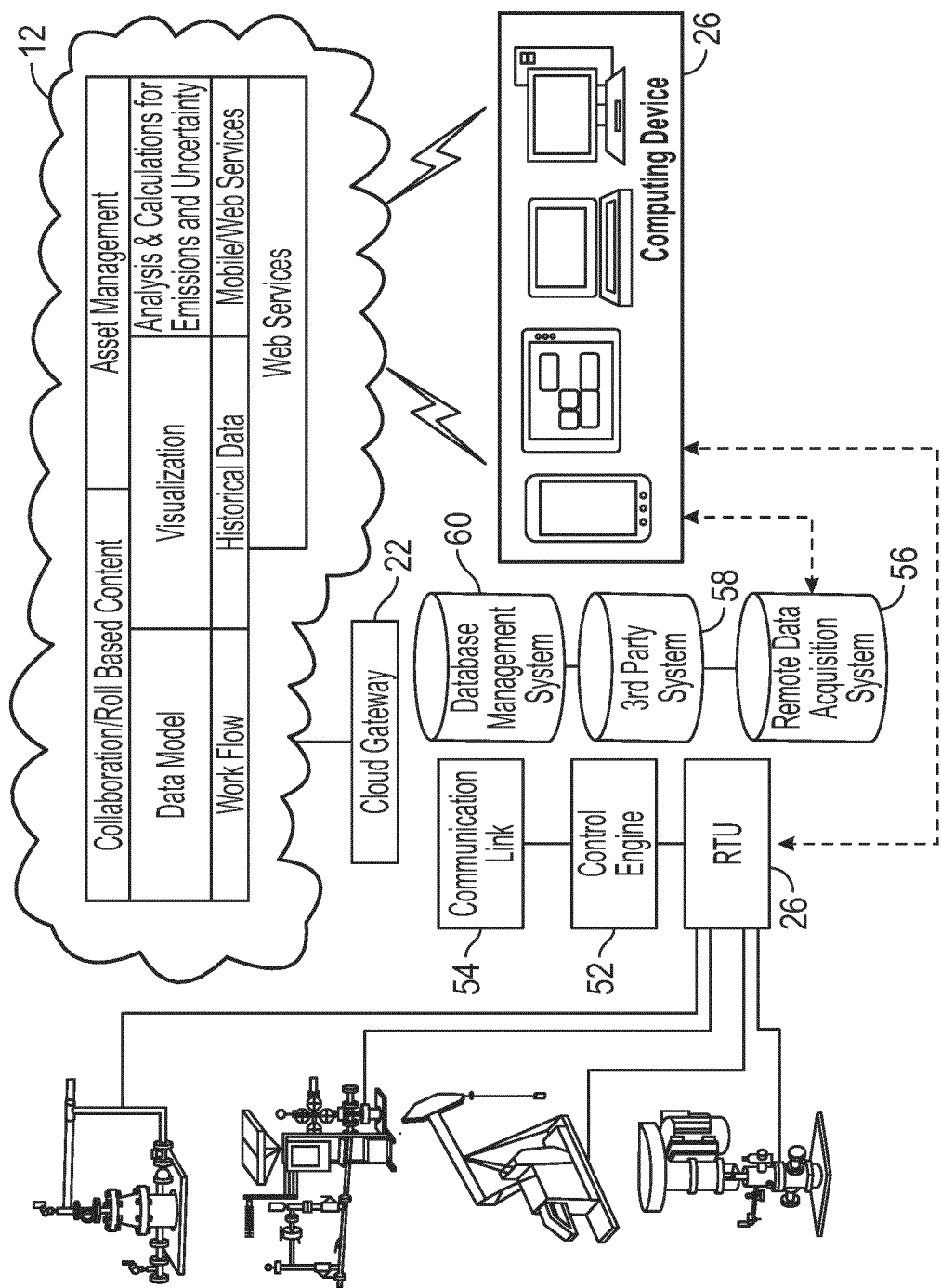
FIG. 3 illustrates an example overview of a cloud-based communication architecture for the example hydrocarbon site of FIG. 2, in accordance with some embodiments presented herein.

Accordingly, in one embodiment, the RTU 46 may communicatively couple to the cloud-based computing system 12 via a cloud-based communication architecture or services 20 as shown in FIG. 3. Referring to FIG. 3, the RTU 46 may communicatively couple to a control engine 52 such as ControlLogix® or the like. The control engine 52 may, in turn, communicatively couple to a communication link 54 that may provide a protocol or specifications such as OPC Data Access that may enable the control engine 52 and the RTU 46 to continuously communicate its data to the cloud-based computing device 12 or computing system 26. The communication link 54 may be communicatively coupled to the cloud gateway 22, which may then provide the control engine 52 and the RTU 46 access to communicate with the cloud-based computing system 12. Although the RTU 46 is described as communicating with the cloud-based computing system 12 via the control engine 52 and the communication link 54, it should be noted that in some embodiments, the RTU 46 may communicate directly with the cloud gateway 22 like the industrial device 16 and 18 of FIG. 1 or may communicate directly with the cloud-based computing system 12.

In some embodiments, the computing systems 26 (e.g., RTU) may communicatively couple to the control engine 52 or the communication link 54 via an Ethernet IP/Modbus network. As such, a polling engine may connect to the computing systems 26 (e.g., RTU) via the Ethernet IP/Modbus network to poll the data acquired by the computing systems 26 (e.g., RTU). The polling engine may then use an Ethernet network to connect to the cloud-based computing system 12.

As mentioned above, the RTU 46 may monitor and control various types of well devices (e.g., the flare 48, etc.) and may send the data acquired by the respective well devices to the cloud-based computing system 12 according to the architecture described above. For example, as shown in FIG. 3, the RTU 46 may monitor and control an electrical submersible pump (ESP), a gas lift (GL), a rod pump controller (RPC), a progressive cavity pump (PCP), and the like. In the ESP, the RTU 46 may sense and control the wellhead and other operating variables of the ESP system. In the GL, the RTU 46 may adjust a gas lift injection flow to operator flow rate, compute real-time estimated gas-oil-water production, and the like. In the RPC, the RTU 46 may provide advance rod pump controlling operations for beam pump applications and the like. The RTU 46 may monitor both polish rod load and continuous walking beam position to develop dynamometer cards. In the PCP, the RTU 46 may provide local and remote monitoring of the wellhead and other PCP variable. Here, the RTU 46 may perform basic analysis and adjust the pumping conditions of the PCP based on the received data from the PCP. In various embodiments, the RTU 46 may monitor and control various of the flare controllable elements and may send the data acquired by the respective flare controllable elements to the cloud-based computing system 12.

In addition to the RTU 46 and the control engine 52 being able to communicate with the cloud-based computing system 12, remote data acquisition systems 56, third party systems 58, and database management systems 60 may communicatively couple to the cloud gateway 22. The remote data acquisition systems 56 may acquire real-time data transmitted by various data sources such as the RTU 46 and other third party systems 58. The database management system 60 may be a relational database management system that stores and retrieves data as requested by various software applications. By way of example, the database management system 60 may be a SQL server, an ORACLE server, an SAP server, or the like.

As mentioned above, the computing device 26 may communicatively couple to the RTU 46 and the cloud-based computing system 12. As shown in FIG. 3, the computing device 26 may include a mobile device, a tablet device, a laptop, a general purpose computer, or the like. In certain embodiments, the computing device 26 may communicatively couple with the remote data acquisition systems 56, the third party system 58, and the database management system 60. By communicating with all of these types of devices, the computing device 26 may receive data and generate visualizations associated with each respective device, thereby providing the user of the computing device 26 a more efficient manner in which to view and analyze the data. Moreover, since the computing device 26 may receive data from the cloud-based computing system 12, the computing device 26 may receive visualizations and data related to various types of analyses (e.g., emissions calculations and associated uncertainty calculations) and cloud-based services 20 (e.g., emissions and associated uncertainty reporting) provided by the cloud-based computing system 12.

In some embodiments, the cloud-based computing system 12 may include applications related to collaboration or role based content, asset management, data models, visualizations, analysis & calculations, workflows, historical data, mobile web services, web services, and the like. The collaboration or role-based application may include facilitating collaboration between various users of the cloud-based computing system 12 to assist in the commission, operation, or maintenance of well devices at the hydrocarbon site 30. The asset management application may track the hardware and software maintenance of the well devices and the software used therein. The data model application may include algorithms that may simulate various types of data related to the production of hydrocarbons by a well device, the production of hydrocarbons at a hydrocarbon site, and the like based on various process parameter inputs received by the cloud-based computing system 12. The visualization application may generate various types of visualizations such as graphs, tables, data dashboards, and the like based on the data (e.g., emission and uncertainty data) received by the cloud-based computing system 12 and the data available to the cloud-based computing system 12 via the database 24 or the like.

The analysis & calculations applications may include software applications that may provide additional information regarding the data received by the cloud-based computing system 12. For example, the analysis & calculations applications may analyze flow rate data regarding the production of hydrocarbons by a particular well site to determine the amount of emissions emitted by a flare associated with the particular well site. In another example, analysis & calculations applications may determine various emission data for emissions emitted by the flare 48 as described below.

The workflow applications may be software applications that generate workflows or instructions for users of the well device or personnel at the hydrocarbon site 30 may use to perform their respective tasks. In one example, the cloud-based computing system 12 may generate a workflow regarding the monitoring of emissions, commissioning of a well device, troubleshooting an operation issue with a well device, or the like.

In certain embodiments, the workflow applications may determine the workflows based on historical data stored within the cloud-based computing system 12. That is, the historical data may include data related to previous items produced by any application within the cloud-based computing system 12 such as workflows, data analyses, reports, visualizations, and the like related emissions and uncertainty thereof. Moreover, the historical data may include raw data acquired by the RTU 46 or any other device and received by the cloud-based computing system 12. As such, the cloud-based computing system 12 may use the historical data to perform additional analyses on the received data, simulate or forecast how the operations of a well device may change, simulate how the production of hydrocarbons at a well site may change, emission data at the well site, and the like.

The cloud-based computing system 12 may provide mobile web services and web services that may enable the computing device 26, or any other device communicatively coupled to the cloud-based computing system 12, to access the Internet, Intranet, or any other network that may be available. Moreover, the cloud-based computing system 12 may use the web services to access information related to various analyses that it may be performing and the like.

Flare Configuration

Figure 4:
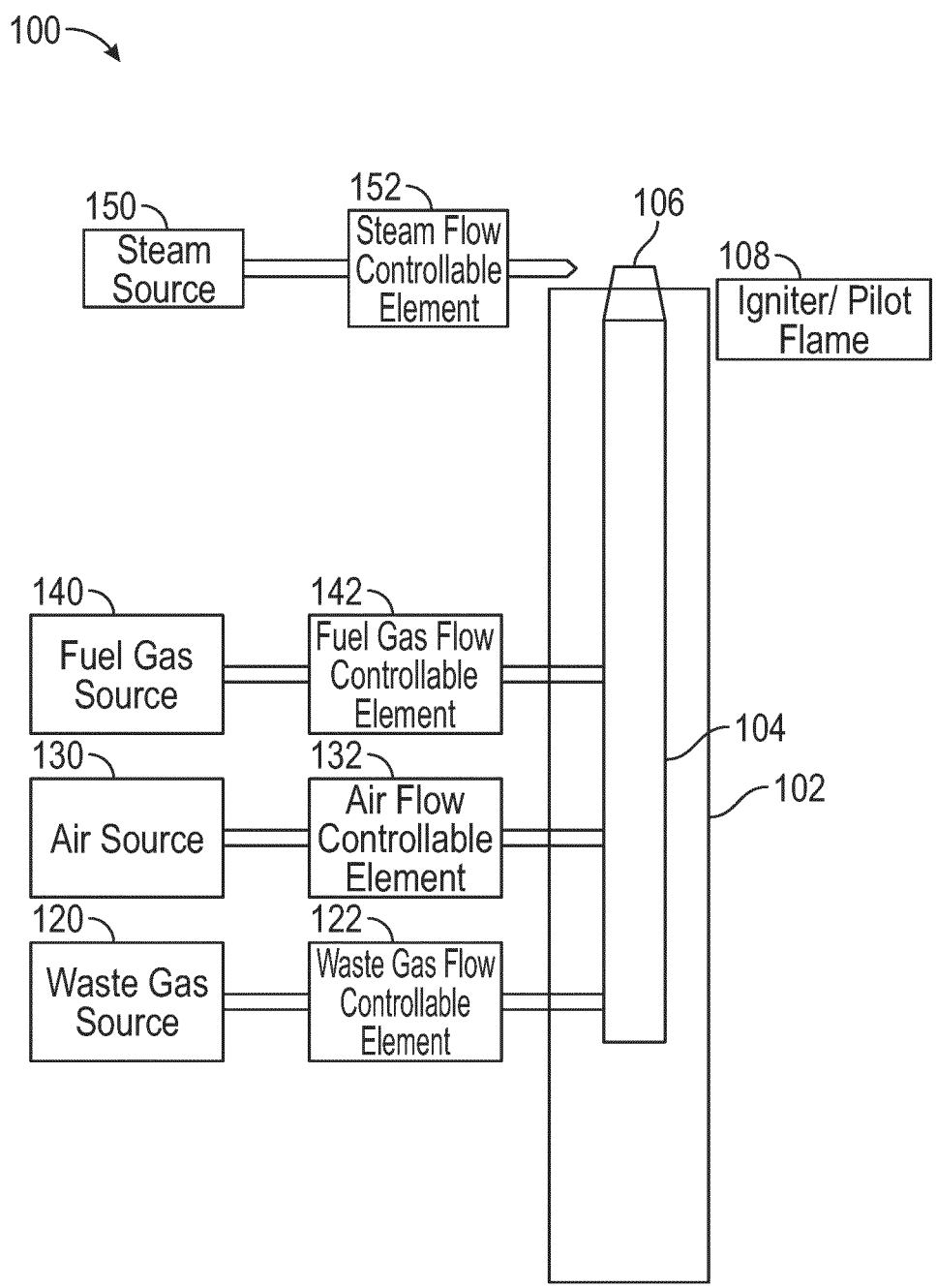
FIG. 4 illustrates a block diagram of a flare for flaring of waste gases, in accordance with some embodiments presented herein.

Referring now to FIG. 4, the flare 48 can be embodied as flare 100, according to some embodiments. In other embodiments, the flare 100 may embody a flare at an emission site other than the hydrocarbon site 30 (e.g., a refinery, a midstream hub, etc.). As shown in FIG. 4, the flare 100 includes a flaring tower 102 configured to space the flame of the flare 100 off the ground, according to some embodiments. For example, the flaring tower 102 of the flare 100 may space the flame of the flare 100 off of the ground to reduce exposure to the flame (e.g., reduce exposure of operators to the heat of the flame, reduce exposure of operators to the gases released by the flame, etc.). In other embodiments, the flame of flare 100 may be located close the ground and alternate means may be utilized to reduce exposure to the flame (e.g., flame shielding, etc.).

As shown in FIG. 4, the flare 100 includes a flare pipe 104 (e.g., a flare tube, etc.) supported by the flaring tower 102 and configured to carry gases through the flaring tower 102, according to some embodiments. The flare pipe 104 may extend downward from a top end of the flaring tower 102 towards a bottom of the flaring tower 102. The flare pipe 104 defines a flare pipe opening extending along a length of the flare pipe 104 configured to carry gases along the flare pipe 104. For example, the flare pipe opening may be configured to carry gases from a lower end of the flare pipe 104 towards an upper end of the flare pipe 104. In some embodiments, the flare includes a plurality of the flare pipes 104 configured to carry gasses through the flaring tower 102. Each of the plurality of the flare pipes 104 may be configured to carry gasses from different sources or each of the plurality of the flare pipes 104 may be configured to carry a portion of gasses received by the flare 100 from a single source. For example, a first of the flare pipes 104 may be fluidly coupled to a first gas source and be configured to receive a first gas from the first gas source, a second of the flare pipes 104 may be fluidly coupled to a second gas source and be configured to receive a second gas from the second gas source, and a third of the flare pipes 104 may be fluidly coupled to a third gas source and be configured to receive a third gas from the third gas source.

As shown in FIG. 4, the flare 100 includes a nozzle 106 coupled to flaring tower 102 at a top end of the flaring tower 102, according to some embodiments. The nozzle 106 defines a nozzle opening fluidly coupled to the flare pipe 104. The nozzle opening of the nozzle 106 is configured to receive gasses from the flare pipe 104 and emit gasses out of the flare 100. In some embodiments, the nozzle opening of the nozzle 106 may be variable such that the diameter of the nozzle opening may be controlled. For example, the nozzle 106 may include a nozzle iris that can be actuated between an open configuration (e.g., a first configuration, etc.) where the nozzle opening has a first diameter and a closed configuration (e.g., a second configuration, etc.) where the nozzle opening has a second diameter that is smaller than the first diameter. In other embodiments, the diameter of the nozzle opening of the nozzle 106 may be fixed. Additionally different of the flares 100 may have different configurations of the nozzles 106 configured with different diameters of the nozzle openings of the nozzles 106 and/or geometry of the nozzles 106 that are designed to accommodate different gas flow rates and compositions. In some embodiments, the flare 100 may include multiple of the nozzles 106. For example, when the flare 100 includes multiple of the flare pipes 104, the flare 100 may include one of the nozzles 106 fluidly coupled to each of the flare pipes 104. As a result, each of the nozzles 106 may be operated independently based on the gasses received from each of the flare pipes 104. For example, a first of the nozzles 106 may be operated according to first nozzle parameters based on receiving a first gas from a first of the flare pipes 104, a second of the nozzles 106 may be operated according to second nozzle parameters based on receiving a second gas from a second of the flare pipes 104, and a third of the nozzles 106 may be operated according to third nozzle parameters based on receiving a third gas from a third of the flare pipes 104.

As shown in FIG. 4, the flare 100 includes an igniter 108 positioned proximate the nozzle 106 and configured to ignite the gas emitted from the nozzle 106. In some, embodiments, the igniter 108 is configured as a pilot flame igniter that includes a constant flame located proximate the nozzle 106 that is configured to ignite the gasses emitted from the nozzle 106. In other embodiments, the igniter 108 may be configured to ignite the gas emitted from the nozzle 106 when the gas starts to flow from the nozzle 106. For example, the igniter 108 may be configured to generate sparks in response to gas flowing through the nozzle 106. In some embodiments, the flare may include multiple of the igniters 108 (e.g., in the flares 100 including multiple of the nozzles 106, in the flares 100 that include a primary of the igniters 108 and a backup of the igniters 108, etc.).

As shown in FIG. 4, the flare pipe 104 is fluidly coupled to a waste gas source 120, according to some embodiments. The waste gas source 120 supplies a flow of a waste gas (e.g., a gas no longer useful in a production process, etc.) to the flare pipe 104. In some embodiments, the waste gas source 120 may be the wellhead distribution manifolds 38, the separators 40, the storage tanks 42, and/or other well devices of the hydrocarbon site 30. In some embodiments, the waste gas from the waste gas source 120 is natural gas (e.g., methane, ethane, propane, etc.) that is an unwanted byproduct of hydrocarbon production (e.g., natural gas that cannot be combusted to power the hydrocarbon site 30, natural gas that cannot be injected into well sites of the hydrocarbon site 30, etc.). The natural gas may include components that the flare 100 may convert into carbon dioxide through combustion of the waste gas. For example, the waste gas may include carbon monoxide that cannot normally be emitted into the atmosphere (e.g., prevented by regulations, etc.). The flare 100 may convert the carbon monoxide in the waste gas into carbon dioxide that can be emitted into the atmosphere (e.g., allowed by regulations, etc.).

As shown in FIG. 4, the flare 100 includes a waste gas controllable element 122 (e.g., a waste gas valve, a waste gas compressor, etc.) configured to control a flow rate of the waste gas entering the flare pipe 104 from the waste gas source 120, in some embodiments. For example, the waste gas controllable element 122 may be operated by the RTU 46 to control the flow rate of the waste gas entering the flare pipe 104 from the waste gas source 120. In some embodiments, the waste gas controllable element 122 is configured to control a pressure of the waste gas entering the flare pipe 104 from the waste gas source 120. In other embodiments, the flare 100 may not include the waste gas controllable element 122 (e.g., when the waste gas source 120 is uncontrollable, etc.).

As shown in FIG. 4, the flare pipe 104 is fluidly coupled to an air source 130, according to some embodiments. The air source 130 supplies a flow of air (e.g., a mixture of gases including oxygen and inert gases, environmental air, etc.) to the flare pipe 104. In some embodiments, the air source 130 may be an air intake configured to intake air from the atmosphere or a tank (e.g., an oxygen tank, etc.). The air (e.g., oxygen, etc.) from the air source 130 may be provided to the flare pipe 104 to increase an oxygen content of the gasses in the flare pipe 104 to increase a combustion efficiency of the flare 100 (e.g., convert a higher percentage of the waste gas into carbon dioxide, combust a higher percentage of methane contained in the waste gas, etc.). For example, the air from the air source 130 may be added to the waste gas from the waste gas source 120 in order to increase an amount of waste gas that is combusted by the flare 100 to decrease an amount of harmful gasses emitted by the flare 100.

As shown in FIG. 4, the flare 100 includes an air controllable element 132 (e.g., an air valve, an air compressor, etc.) configured to control a flow rate of the air entering the flare pipe 104 from the air source 130, according to some embodiments. For example, the air controllable element 132 may be operated by the RTU 46 to control the flow rate of the air entering the flare pipe 104 from the air source 130. In some embodiments, the air controllable element 132 is configured to control a pressure of the air entering the flare pipe 104 from the air source 130. In other embodiments, the flare 100 may not include the air controllable element 132 (e.g., when the air source 130 is uncontrolled, etc.).

As shown in FIG. 4, the flare pipe 104 is fluidly coupled to a fuel gas source 140 (e.g., a purified fuel gas source, a propane tank, etc.), according to some embodiments. The fuel gas source 140 supplies a flow of fuel gas (e.g., propane, butane, hydrogen, etc.) to the flare pipe 104. The fuel gas may be a purified combustible gas that is added to gasses in the flare pipe 104 to increase a combustion efficiency of the flare 100. For example, the fuel gas from the fuel gas source 140 may be added to the waste gas from the waste gas source 120 in order to increase an amount of waste gas that is combusted by the flare 100 to decrease an amount of harmful gasses emitted by the flare 100.

As shown in FIG. 4, the flare 100 includes a fuel gas controllable element 142 (e.g., a waste gas valve, a waste gas compressor, etc.) configured to control a flow rate of the waste gas entering the flare pipe 104 from the fuel gas source 140, according to some embodiments. For example, the fuel gas controllable element 142 may be operated by the RTU 46 to control the flow rate of the waste gas entering the flare pipe 104 from the fuel gas source 140. In some embodiments, the fuel gas controllable element 142 is configured to control a pressure of the waste gas entering the flare pipe 104 from the fuel gas source 140. In other embodiments, the flare 100 may not include the fuel gas controllable element 142 (e.g., when the fuel gas source 140 is uncontrolled, etc.).

As shown in FIG. 4, a steam source 150 (e.g., a boiler, a heat exchanger, etc.) is configured to supply a flow of steam (e.g., water vapor, heated water vapor, etc.) to the flare 100, according to some embodiments. The steam from the steam source 150 may be injected proximate the nozzle 106 to create turbulence (e.g., agitation, etc.) in the gas emitted from the nozzle 106 in order to increase the combustion efficiency of the flare 100 by mixing the gas emitted from the nozzle 106 with a higher quantity of surrounding air. For example, the steam from the steam source 150 may be injected into the flow of the gas from the nozzle 106 to increase an amount of waste gas that is combusted by the flare 100 to decrease an amount of harmful gasses emitted by the flare 100.

As shown in FIG. 4, the flare 100 includes a steam controllable element 152 (e.g., a steam valve, a steam compressor, a steam pump, etc.) configured to control a flow rate of the steam provided to the flare 100, according to some embodiments. For example, the steam controllable element 152 may be operated by the RTU 46 to control the flow rate of the steam provided to the flare 100 from the steam source 150. In some embodiments, the steam controllable element 152 is configured to control a pressure of the steam provided to the flare 100 from the steam source 150. In other embodiments, the flare 100 may not include the steam controllable element 152 (e.g., when the steam source 150 is uncontrolled, etc.).

Flare Carbon Emission Cost System

Figure 5:
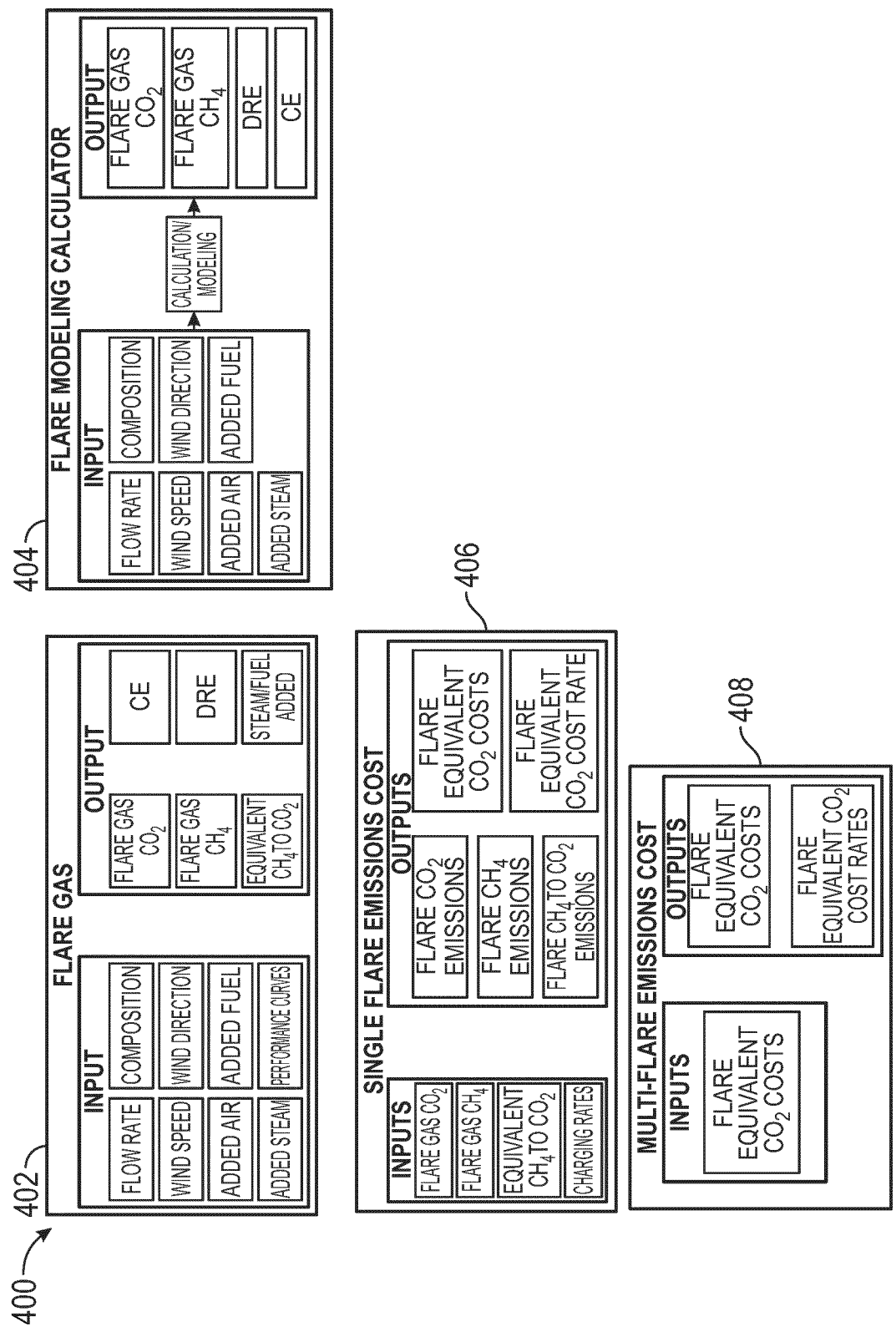
FIG. 5 illustrates a block diagram of a system for determining an emission cost associated with a flare of an emissions site, according to some embodiments.

With reference to FIG. 5, the system 12 can be configured to measure flare emission costs as a system 400. The system 400 can be part of the system 12 and include sensors and computing components discussed above to perform the analysis and reporting described below.

The system 400 includes a flare gas module 402, a flare modeling calculator 404, a single flare emission cost calculator 406, and a multi-flare emission cost calculator 408. In some embodiments, the flare gas module 402 receives data associated with materials (e.g., added materials, gasses, etc.) received by the flare 100. For example, the flare gas module 402 may receive data representative of a quantity, a flow rate, a pressure, and/or a composition of the waste gas provided to the flare 100 from the waste gas source 120. As another example, the flare gas module 402 may receive data representative of a quantity, a flow rate, a pressure, and/or a composition of the air provided to the flare 100 from the air source 130. As another example, the flare gas module 402 may receive data representative of a quantity, a flow rate, a pressure, and/or a composition of the fuel gas provided to the flare 100 by the fuel gas source 140. As another example, the flare gas module 402 may receive data representative of a quantity, a flow rate, a pressure, and/or a composition of the steam provided to the flare 100 by the steam source 150. In some embodiments, the flare gas module 402 receives data associated with attributes of the flare 100. For example, the flare gas module 402 may receive data representative of a diameter of the nozzle 106, a state of the igniter 108, and/or a length of the flare pipe 104. In some embodiments, the flare gas module 402 may receive data related to performance curves for flaring operations of the flare 100. For example, the flare gas module 402 may receive data associated with performance curves that were generated based on test operations of the flare 100 or test operations performed in a test environment (e.g., on a test flare, etc.).

In some embodiments, the flare gas module 402 may receive data associated with forecasted gasses that will be received by the flare 100 over a future time frame (e.g., a future time horizon, a future time period, etc.). For example, the flare gas module 402 may receive data representative of a forecasted quantity or flow rate of the waste gas provided to the flare 100 by the waste gas source 120 over the future time frame, a forecasted quantity or flow rate of the air provided to the flare 100 by the air source 130 over the future time frame, a forecasted quantity or flow rate of the fuel gas provided to the flare 100 by the fuel gas source 140 over the future time frame, and/or a forecasted quantity or flow rate of the steam provided to the flare 100 by the steam source 150 over the future time frame. In some embodiments, the flare gas module 402 may receive sensor data associated with the operation of the flare 100. For example, the flare gas module 402 may receive sensor data from the RTU 46 associated with the flare 100.

The flare gas module 402 receives data associated with weather proximate the flare 100, according to some embodiments. For example, the flare gas module 402 may receive data representative of temperature, precipitation conditions, wind speed, and/or wind direction proximate the flare 100. In some embodiments, the flare gas module 402 receives data associated with forecasted weather proximate the flare 100 over the future time frame. For example, the flare gas module 402 may receive data indicating that there will be rain proximate the flare 100 over two of the four days included in the future time frame.

The flare gas module 402 uses the data received by the flare gas module 402 to generate a flare gas carbon dioxide measurement, a flare gas methane measurement, a methane to carbon dioxide equivalent measurement, an added air, fuel, and steam measurement, a combustion efficiency measurement, and/or a destruction and removal efficiency measurement, according to some embodiments. These measurements can be made based upon readings from sensors such as multi-spectral infrared (IR) imagers or other analyzers that measure relative concentrations of unburned hydrocarbons, product of combustion (i.e., carbon dioxide), and product of incomplete combustion represented by carbon monoxide (CO) and/or methane ($CH_4$). In some embodiments, the methane to carbon dioxide equivalent measurement is provided by regulators. For example, a governmental regulator may determine that methane is equivalent to ten times as much carbon dioxide based on studies corresponding to an environmental impact of methane and carbon dioxide. In some embodiments, the flare gas module 402 may receive modeling data from the flare modeling calculator 404 that the flare gas module 402 may utilize to generate the outputs of the flare gas module 402.

The modeling calculator 404 receives the data received by flare gas module 402 and provides the flare gas carbon dioxide measurement, the flare methane measurement, the combustion efficiency measurement, and the destruction and removal efficiency measurement to the flare gas module 402, according to some embodiments. The flare modeling calculator 404 uses the data received by the flare gas module 402 and a model of the flare (e.g., a computer model, a paper model using known calculations, etc.) to determine the outputs of the flare modeling calculator 404. In some embodiments, the flare modeling calculator 404 may use computational fluid dynamics (CFD) to model the combustion of the flare and determine the outputs of the flare modeling calculator 404. In other embodiments, the flare modeling calculator 404 may use simplified methods (e.g., calculations with simplified inputs, calculations with assumed values, etc.) to model the combustion of the flare and determine the outputs of the flare modeling calculator 404 (e.g., in cases where there are not sufficient inputs to use CFD, in cases where there is not sufficient processing power to use CFD, etc.). The flare modeling calculator 404 determines the flare gas carbon dioxide measurement representing the carbon dioxide emissions associated with the flare operation and the flare gas methane measurement representing the methane emissions associated with the flare. In some embodiments, the flare modeling calculator 404 may be included in system 12, computing device 26, and/or RTU 46. The flare modeling calculator 404 can be part of flare gas module 402.

The single flare emission cost calculator 406 receives flare gas carbon dioxide measurement by flare gas module 402, the flare gas methane measurement by flare gas module 402, the carbon dioxide to methane equivalent from flare gas module 402, and/or the carbon dioxide charging rates from regulators, according to some embodiments. The carbon dioxide charging rates represent the carbon dioxide emission costs set by regulators or other regulating bodies and typically are measured in price per weight of carbon dioxide (e.g., dollars per ton of carbon dioxide, pounds per tonne of carbon dioxide, etc.). The single flare emission cost calculator 406 determines a flare carbon dioxide measurement representing carbon dioxide emissions associated with the flare, a flare methane measurement representing methane emissions associated with the flare, a flare equivalent carbon dioxide measurement representing methane emissions associate with the flare in units of carbon dioxide, a flare carbon dioxide equivalent emission cost representing cost of equivalent carbon dioxide emissions associated with the flare, and/or a flare carbon dioxide equivalent rate representing the cost rate of equivalent carbon dioxide emissions (e.g., the emission cost per unit of time, etc.) associated with the flare based on the inputs received by the single flare emission cost calculator 406.

The carbon dioxide equivalent measurement generated by the single flare emission cost calculator 406 is a measurement of emissions emitted by the flare 100 that includes carbon dioxide emissions emitted by the flare 100 as well as other emissions emitted by the flare 100, such as methane, converted to carbon dioxide equivalents so that a measurement of total emissions emitted by the flare 100 can be evaluated using carbon dioxide emissions as a scale (e.g., the carbon dioxide equivalent is equal to twenty-five times the weight of methane emissions, the carbon dioxide equivalent is equal to thirty times the weight of methane emissions, etc.). For example, the carbon dioxide equivalent measurement may be a measurement in metric tonnes of Carbon Dioxide Equivalent that is representative of the carbon dioxide emitted by the flare 100, the methane emitted by the flare 100, the nitrous oxide emitted by the flare 100, and/or any other gasses emitted by the flare 100.

The emission costs generated by the single flare emission cost calculator 406 are representative of costs associated with the emissions emitted by the flare 100. For example, the emission costs may be generated by multiplying the carbon dioxide equivalent measurement generated by the single flare emission cost calculator 406 and an emission cost per unit of carbon dioxide. The emission cost rates generated by the single flare emission cost calculator 406 are representative of a rate of the costs associated with the emissions emitted by the flare 100. For example, the emission cost rates may be representative of a cost in dollars associated with the emissions emitted by the flare 100 for a per hour basis.

In some embodiments, the single flare emission cost calculator 406 may forecast (e.g., predict, determine using predicted inputs, etc.) the various outputs of the single flare emission cost calculator 406 over the future time frame based on forecasted inputs received by the single flare emission cost calculator 406 associated with the future time frame (e.g., received from the flare gas module 402, etc.). For example, the single flare emission cost calculator 406 may forecast the flare carbon dioxide measurement representing carbon dioxide emissions associated with the flare 100 over the future time frame, the flare methane measurement representing methane emissions associated with the flare 100 over the future time frame, the flare carbon dioxide equivalent measurement representing equivalent carbon dioxide emissions of the flare 100 over the future time frame, the flare carbon dioxide cost measurement representing cost of carbon dioxide emissions and equivalent emissions associated with the flare 100 over the future time frame, and/or the flare carbon dioxide equivalent rate representing the cost rate of carbon dioxide emissions and equivalent emissions associated with the flare 100 over the future time frame.

The multi-flare emission cost calculator 408 determines a multi-flare emission cost representing the carbon dioxide emission costs associated with multiple of the flares 100 and/or a multi-flare emission cost rate representing the carbon dioxide emission cost rate associated with the multiple of the flares 100 based on data received from the single flare emission cost calculator 406, according to some embodiments. The emission costs associated with the multiple of the flares 100 or the emission cost rates associated with the multiple of the flares 100 can represent carbon dioxide emission costs or a combination of carbon dioxide emission costs and other emissions such as a methane. In some embodiments, the emissions data received by the multi-flare emission cost calculator 408 includes carbon dioxide equivalents, such that total emissions for the multiple of the flares 100 can be determined with reference to carbon dioxide. In some embodiments, the multi-flare emission cost calculator 408 may forecast the multi-flare emission costs associated with the forecasted emissions of the multiple of the flares 100 over the future time frame.

Low Level Optimization Process

Figure 6:
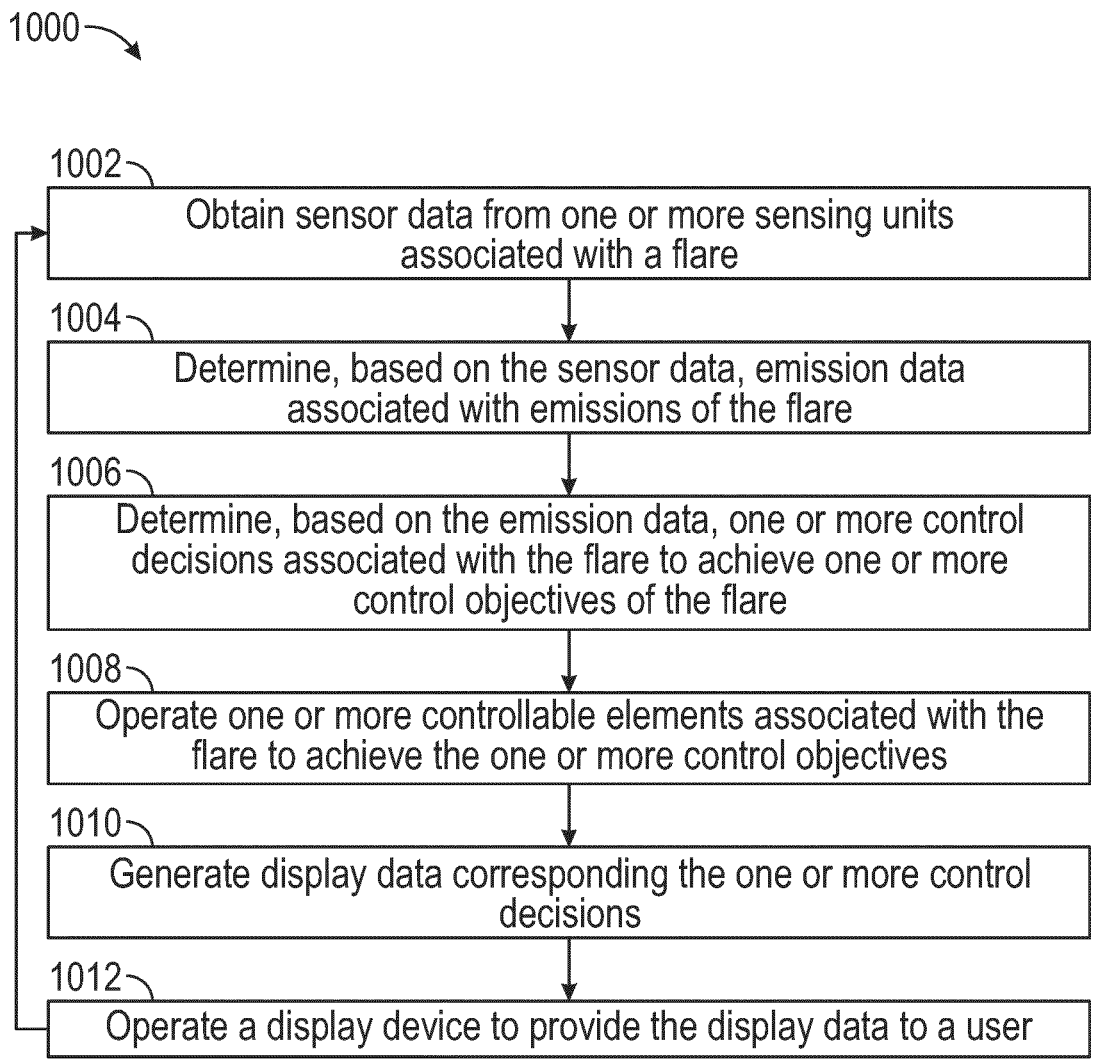
FIG. 6 illustrates a flow diagram of a process for operating a flare using an emission cost system, in accordance with some embodiments presented herein.

Referring now to FIG. 6, a flow diagram of a process 1000 for optimizing operation of a flare using real-time sensor data and predetermined objectives is shown, according to some embodiments. The process 1000 includes steps 1002-1012 and can be performed by the system 12, the computing devices 26, and/or the RTU 46. In some embodiments, different portions of the process 1000 may be performed by the system 12, the computing devices 26, and/or the RTU 46. For example, high level processing may be performed by the system 12 while generation of control signals may be performed by the RTU 46.

The process 1000 includes obtaining sensor data from one or more sensing units associated with a flare (step 1002), according to some embodiments. The sensor data may include temperatures associated with the flare, pressures of gasses associated with the flare, flow rates of gasses associated with the flare, and/or compositions of gasses associated with the flare. For example, the sensor data may include pressures of the waste gas provided to the flare 100 by the waste gas source 120, pressures of the air provided to the flare 100 by the air source 130, pressures of the fuel gas provided to the flare 100 by the fuel gas source 140, and/or pressures of the steam provided to the flare 100 by the steam source 150. In some embodiments, the step 1002 includes obtaining environmental data associated with the flare. For example, the environmental data may include weather conditions proximate the flare, an ambient temperature proximate the flare, and/or an amount of precipitation proximate the flare. In some embodiments, step 1002 is performed by the RTU 46. The sensor data can be provided from the RTU 46 to the control engine 52, to the computing devices 26, and/or to the system 12, according to some embodiments.

The process 1000 includes determining emission data associated with the flare (step 1004), according to some embodiments. The emission data associated with the flare may be determined based on the sensor data received in step 1002. For example, the emission data may be determined based on the sensor data associated with the waste gas provided to the flare 100 by the waste gas source 120, the sensor data associated with the air provided to the flare 100 by the air source 130, the sensor data associated with the fuel gas provided to the flare 100 by the fuel gas source 140, and/or the steam provided to the flare 100 by the steam source 150. In some embodiments, the emission data is determined based on the environmental data. For example, the flare 100 may operate more efficiently (e.g., combust additional methane to convert the methane into carbon dioxide, etc.) when the ambient temperature proximate the flare 100 is higher. As a result, the emissions of the flare 100 may be affected by the ambient temperature proximate the flare 100. In some embodiments, the emission data associated with the flare includes a quantity of the emissions of the flare. For example, the emission data may include a carbon dioxide equivalent measurement of the emissions emitted by the flare 100. In some embodiments, the emission data is time stamped to identify a moment of time associated with the emission data. For example, a first portion of the emission data may be time stamped with a first time to identify that the first portion of the emission data is associated with a first portion of a time frame and a second portion of the emission data may be time stamped with a second time to identify that the second portion of the emission data is associated with a second portion of the time frame.

In some embodiments, the emission data associated with the flare includes an emission cost associated with the emissions emitted by the flare. In various embodiments, step 1004 utilizes the system 400 to determine the emission data associated with the emissions of the flare 100. In some embodiments, step 1004 is performed by the system 12 and/or the computing devices 26. For example, step 1004 may be performed by the system 12 and/or the computing devices 26 instead of the RTU 46 associated with the flare 100 since the system 12 and/or the computing device 26 may have more computing power than the RTU 46, which may be required to run the modeling software utilized by the system 400.

The process 1000 includes determining one or more control decisions associated with the flare to achieve one or more control objectives of the flare (step 1006), according to some embodiments. In some embodiments, step 1006 is performed using a closed loop control that includes the sensor data obtained in step 1002 and the emission data determined in step 1004. For example, the process 1000 may determine the one or more control decisions associated with the flare without receiving input from an operator of the flare. The control decisions determined in step 1006 correspond to controllable elements associated with the flare. The control decisions may be related to operating valves associated with the flare, operating compressors associated with the flare, operating pumps associated with the flare, operating components of the flare (e.g., nozzles, igniters, etc.), or any other controllable elements associated with the flare. For example, the control decisions determined in step 1006 may correspond to controllable elements associated with the flare 100 such as the waste gas controllable element 122, the air controllable element 132, the fuel gas controllable element 142, the steam controllable element 152, the igniter 108 (e.g., when the igniter 108 is a controllable element, etc.), and/or the nozzle 106 (e.g., when the nozzle 106 is a controllable element, etc.).

The control objectives of the flare may include objectives associated with the emissions emitted by the flare. For example, the control objectives of the flare may include preventing a carbon dioxide equivalent measurement of the flare from exceeding a carbon dioxide equivalent threshold, preventing an emission cost associated with the flare from exceeding an emission cost threshold, and/or preventing an emission cost rate associated with the flare from exceeding an emission cost rate threshold. In some embodiments, the control objectives of the flare may include objectives associated with a time frame. For example, the control objectives of the flare may include preventing an emission measurement of the flare over a time frame from exceeding an emission measurement time frame threshold. In some embodiments, step 1006 is performed by the system 12 and/or the computing devices 26. The system 12 and/or the computing devices 26 may implement a PID control scheme to determine the control decisions to meet the control objectives, according to some embodiments.

In some embodiments, the one or more control decisions associated with the flare may include control decisions corresponding to an alarm system associated with the flare. For example, the one or more control decisions may include operating the alarm system associated with the flare in response to the flare exceeding an emission threshold. The emission threshold may be associated with an amount of the emissions emitted by the flare over a time frame, a live rate of emissions emitted by the flare, an emission cost associated with the emissions emitted by the flare over the time frame, a live cost rate of the emission cost associated with the emissions emitted by the flare, etc. As another example, the one or more control decisions may include operating the alarm system associated with the flare in response to a forecast that emissions of the flare over the future time frame will exceed a future emission threshold. The future emission threshold may be associated with an amount of the emissions emitted by the flare over the future time frame, a live rate of emissions emitted by the flare during the future time frame, an emission cost associated with the emissions emitted by the flare over the future time frame, a live cost rate of the emission cost associated with the emissions emitted by the flare during the future time frame, etc.

The process 1000 includes operating one or more controllable elements associated with the flare to achieve the one or more control objectives (step 1008), according to some embodiments. The one or more controllable elements associated with the flare may be operated according to the one or more control decisions determined in step 1006. In some embodiments, step 1008 is performed autonomously or semi-autonomously. For example, the system 12 may perform step 1006 to determine the one or more control decisions associated with the flare 100 and provide the one or more control decisions to the RTU 46. The RTU 46 may autonomously operate the controllable elements associated with the flare 100 based on the one or more control decisions or may semi-autonomously operate the controllable elements associated with the flare 100 based on the one or more control decisions after receiving input from an operator of the flare 100. In other embodiments, at least a portion of step 1008 is not performed autonomously or semi-autonomously. For example, at least one of the controllable elements associated with the flare 100 may be a manually operated controllable element. The controllable decision associated with the manually operated controllable element may be provided to an operator (e.g., via a display, via a user interface, etc.) so that the operator can operate the manually operated controllable element according to the control decision.

The process 1000 includes generating display data corresponding to the one or more control decisions (step 1010), according to some embodiments. For example, the display data may correspond to the one or more control decisions corresponding to the controllable elements of the flare 100. The display data may be generated to provide the one or more control decisions to an operator of the flare 100 such that the operator of the flare 100 is aware of the one or more control decisions. In some embodiments, step 1010 includes generating the display data to correspond to the sensor data obtained in step 1002. For example, the display data may be generated to correspond to the sensor data that had the largest effect on the emission costs associated with the emissions of the flare determined in step 1004. In some embodiments, step 1010 includes generating the display data to correspond to the emission data determined in step 1004. For example, the display data may include a chart that corresponds to the emission data associated with the emissions emitted by the flare 100 over a period of time. In some embodiments, the display data corresponds to a live rate of the emissions of the flare 100. For example, the display data may correspond to a rate of an amount of methane emissions emitted by the flare 100 per minute.

The process 1000 includes operating a display device to provide the display data to a user (step 1012), according to some embodiments. In some embodiments, the display device is any of the computing devices 26 (FIG. 1). For example, the display device may be a cellphone, a laptop computer, or any other screen configured to provide display data to a user. In some embodiments, the display device is configured to access the display data via a server or a webpage. In some embodiments, step 1012 may include operating alarms and/or alerts if the emission costs associated with the emissions emitted by the flare and/or emission cost rates associated with the emissions emitted by the flare are above a predetermined threshold.

Optimization Controller

Figure 7:
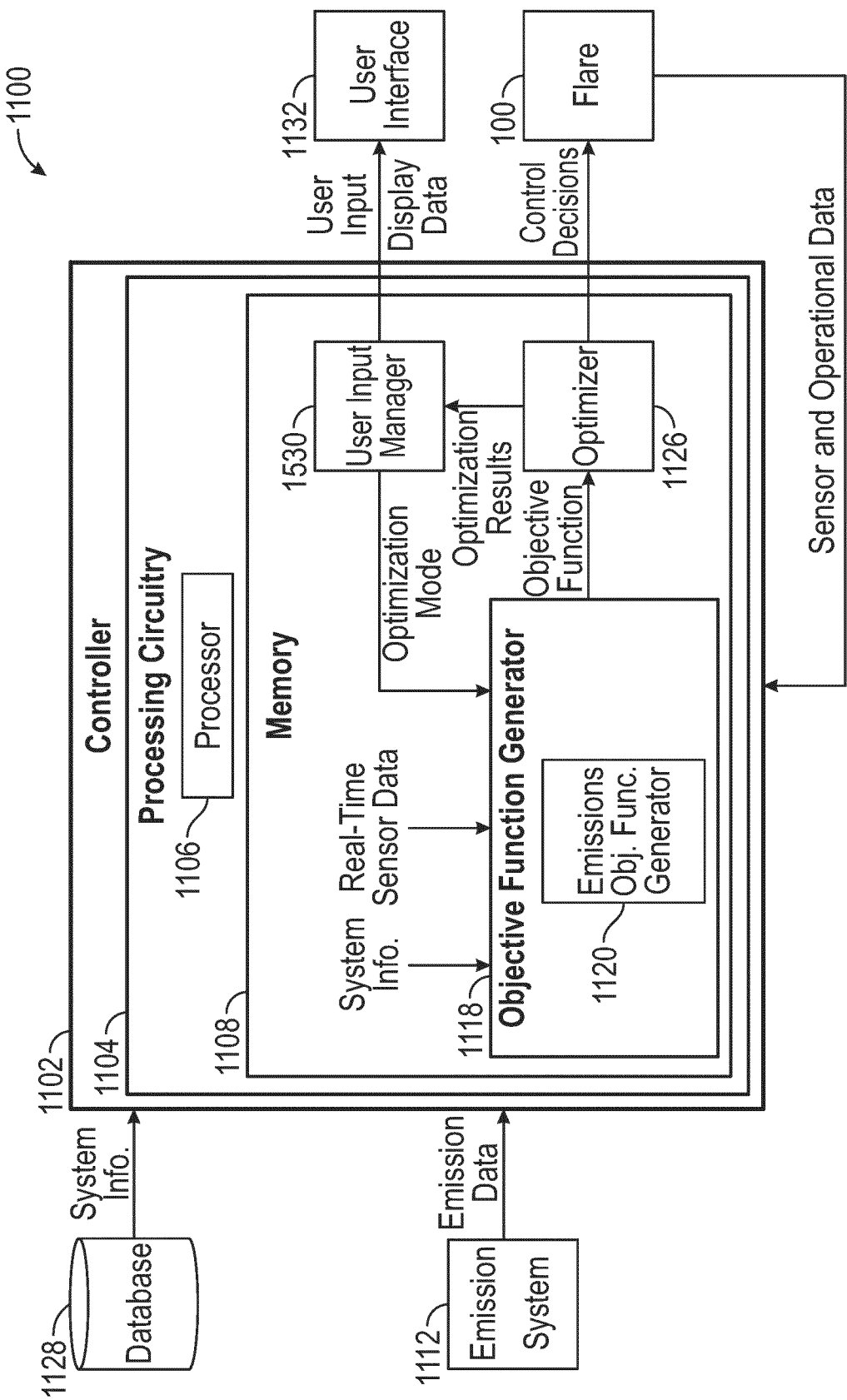
FIG. 7 illustrates a block diagram of a controller configured to perform an optimization for a flare of an emissions site, according to some embodiments.

Referring particularly to FIG. 7, a system 1100 for optimizing operation of the flare 100 is shown, according to some embodiments. In some embodiments, the system 1100 is configured to generate control decisions for the controllable elements associated with the flare 100 to operate the flare 100 optimally. For example, the system 1100 may be configured to operate equipment, pumps, chemical injections, etc., associated with the flare 100 based on control decisions that cause the flare 100 to be operated optimally according to certain control objectives of the flare 100. In some embodiments, the system 1100 includes a controller 1102, a database 1128, an emission system 1112, a user interface 1132, and the flare 100 or multiple of the flares 100. In some embodiments the controller 1102 may be the system 12, the RTU 46, and/or the computing devices 26. In some embodiments, the database 1128 is stored locally on the controller 1102, or stored on a cloud computing system. In some embodiments the database 1128 may be the database 24. In some embodiments, the emission system 1112 is system 400. In some embodiments, the controller 1102 is configured to receive system information associated with the flare 100 from the database 1128, flare emission costs associated with the emissions emitted by the flare 100 from the emission system 1112, and/or sensor and/or operational data from the flare 100 or sensors thereof (e.g., pressure sensors, flow meters, temperature sensors, etc.). In some embodiments, the controller 1102 is configured to receive one or more user inputs from the user interface 1132 indicating a desired optimization mode for the controller 1102 corresponding to the flare 100. In some embodiments, the user interface 1132 may be the computing device 26 (e.g., a personal computer, a cell phone, etc.). In some embodiments, the controller 1102 is configured to operate the user interface 1132 to display optimization results associated with the flare 100. In some embodiments, the controller 1102 is configured to provide control decisions to the flare 100 to operate the flare 100 according to the control decisions that are generated as a result of the optimization (e.g., increase gas flow to the flare 100, increase steam flow to the flare 100, decrease fuel gas flow to the flare 100, modify the diameter of the nozzle 106, etc.). In some embodiments, the system 1100 may be used to optimize operations of multiple of the flares 100. For example, the system 1100 may be used to operate a first of the flares 100 and a second of the flares 100 to optimize a combined emission amount emitted by the first of the flares 100 and the second of the flares 100.

The controller 1102 includes processing circuitry 1104 including a processor 1106 and a memory 1108. The processor 1106 can be a general purpose or specific purpose processor, an application specific integrated circuit (ASIC), one or more field programmable gate arrays (FPGAs), a group of processing components, or other suitable processing components. The processor 1106 may be configured to execute computer code and/or instructions stored in the memory 1108 or received from other computer readable media (e.g., CDROM, network storage, a remote server, etc.).

The memory 1108 can include one or more devices (e.g., memory units, memory devices, storage devices, etc.) for storing data and/or computer code for completing and/or facilitating the various processes described in the present disclosure. The memory 1108 can include random access memory (RAM), read-only memory (ROM), hard drive storage, temporary storage, non-volatile memory, flash memory, optical memory, or any other suitable memory for storing software objects and/or computer instructions. The memory 1108 can include database components, object code components, script components, or any other type of information structure for supporting the various activities and information structures described in the present disclosure. The memory 1108 can be communicably connected to the processor 1106 via the processing circuitry 1104 and can include computer code for executing (e.g., by the processor 1106) one or more processes described herein.

Referring still to FIG. 7, the memory 1108 includes an objective function generator 1118, an optimizer 1126, and a user input manager 1130, according to some embodiments. In some embodiments, the objective function generator 1118 is configured to receive a desired or selected optimization mode from the user input manager 1130 as provided by the user input. In some embodiments, the objective function generator 1118 includes an emission objective function generator 1120. The objective function generator 1118 is configured to receive system information, real-time sensor data, and/or forecasted system information to generate the objective function according to the optimization mode, according to some embodiments. In some embodiments, the system information is the system information provided by the database 1128. The system information can include information regarding equipment, equipment models, interrelationships between the different equipment, pumps, etc., layout, etc., of the flare 100. In some embodiments, the system information includes models of multiple of the flares 100 (e.g., models of each of the flares 100, etc.), or models of the various components of the equipment of the flares 100. For example, the models of the flares 100 may be equipment performance curves, mathematical equations, multi-dimensional graphs, CFD models, etc., showing modeled or forecasted operation of the flares 100 with respect to control decisions (e.g., the emission cost of a pair of the flares 100 if a first flare is operated at a first flow rate and a second flare is operated at a second flow rate, etc.).

In some embodiments, the system information includes information regarding differences in an emission make up between multiple of the flares 100. For example, the system information may include first data associated with a first methane content and a first carbon dioxide content of first emissions emitted by a first of the flares 100 and second data associated with a second methane content and a second carbon dioxide content of second emissions emitted by a second of the flares 100. In some embodiments, the models of the flares 100 forecast or estimate one or more output variables (e.g., emission cost associated with emissions of the flare 100, emissions of the flare 100, etc.) as a function of one or more input variables (e.g., flow rate of the emissions, flame size, nozzle size, etc.). In some embodiments, the models utilized by the objective function generator 1118 may be the models utilized by the system 400.

In some embodiments, the real-time sensor data includes the sensor and operational data. For example, the real-time sensor data may include sensor data associated with the flare 100 that is generated by the sensors associated with the RTU 46. In some embodiments, the real-time sensor data is used by the objective function generator 1118 to generate the objective function.

When the optimization mode is selected to optimize the operation of the flare 100, the objective function generator 1118 implements the emission objective function generator 1120 and generates an objective function that quantitatively forecasts or estimates the emissions of the flare 100 as a function of one or more control decisions subject to one or more constraints. In some embodiments, when an emission cost optimization mode is selected to optimize the operation of the flare 100, the emission objective function generator 1120 is implemented to generate an objective function that quantitatively forecasts or estimates the emissions costs associated with the emissions of the flare 100 as a function of one or more control decisions subject to one or more constraints. In some embodiments, the emission objective function generator 1120 utilizes system 400 as a portion of the objective function that quantitatively forecasts or estimates emission costs of the flare 100. For example, the emission objective function generator 1120 may utilize the flare modeling calculator 404 to determine the emissions of the flare 100. In some embodiments, the emission objective function generator 1120 is implemented to forecast emissions of the flare 100 over a future time frame as a function of one or more control decisions based on sensor data and the inputs and outputs of system 400 described in more detail above.

For example, the objective function may express emissions of the flare 100 over the future time frame subject to one or more constraints. The emission objective function can have the form:

$$EC(x) = \sum_{k=1}^{m} (\text{Flare Emission Cost})_k$$

where k is a time step in an optimization period or time frame, m is a total number of timesteps in the optimization period or the future time frame, and x is a set of decision or controllable variables for the optimization.

In some embodiments, the optimization has the form:

minimize $E(x)$ so that the optimizer 1126 is configured to determine values for the decision or control variables x that minimize the emissions E of the flare 100 over the optimization period or the time frame.

In some embodiments, the optimization has the form:

minimize $EC(x)$ so that the optimizer 1126 is configured to determine values for the decision or control variables x that minimize the emission costs EC associated with the emissions of the flare 100 over the optimization period or the time frame.

In some embodiments, the decision variables x are or include flow rates to the flare 100, or multiple of the flares 100. For example, an nth flare may have a function or model:

$E_{flare,n} = f_{flare,n}(x)$ where $E_{flare,n}$ is an estimated amount of the emissions produced by the nth flare to operate to achieve the x control decision (e.g., vent a quantity Q of a waste gas, etc.) over a time step or instantaneously, and $f_{flare,n}$ is a function for the nth flare that forecasts emissions of the nth flare as a function of the control or decision variable.

As another example, an nth flare may have a function or model:

$EC_{flare,n} = f_{flare,n}(x)$ where $EC_{flare,n}$ is an estimated amount of the emission costs associated with the emissions produced by the nth flare to operate to achieve the x control decision (e.g., vent a quantity Q of a waste gas, etc.) over a time step or instantaneously, and $f_{flare,n}$ is a function for the nth flare that forecasts emission costs associated with the emissions of the nth flare as a function of the control or decision variable.

In some embodiments, the emission objective function is minimized subject to one or more constraints. In some embodiments, the constraints include limits on the fluid storage of the site, the production requirements of the site, the operational status of the flares, etc. In some embodiments the constraints are limits (e.g., upper and lower limits) of any of the decision or control variables x. In some embodiments, the constraints are inter-relationships between different of the control or decision variable x. For example, adjusting one of the control decisions may affect a limit of another of the control decisions. In some embodiments, the constraints include a minimal amount of product produced by the well sites 28 (e.g., find optimal control decisions that minimize emission costs of the flare 100 but still produce a particular amount of product, etc.). In some embodiments, the constraints include a maximum flow rate through the nozzle 106 (e.g., find optimal control decisions that minimize emissions of the flare 100 but does not reduce the reliability of the nozzle 106, etc.).

In some embodiments, the objective function generator 1118 is configured to use the system information to construct the objective functions, and to use the real-time sensor data to populate one or more terms or variables of the objective function. For example, the real-time sensor data can be used to inform the objective function generator 1118 regarding current conditions of the flare 100, current operational status of equipment of the flare 100, weather conditions proximate the flare 100, etc. In various embodiments, the objective function generator 1118 is configured to use forecasted data to populate one or more terms or variables of the objective function. For example, forecasted sensor data can be used to inform the objective function generator 1118 regarding forecasted conditions of the flare 100, forecasted operational statuses of the equipment of the flare 100, forecasted weather conditions at the flare 100, etc.

The optimizer 1126 is configured to obtain any of the objective functions described herein from the objective function generator 1118 and optimize (e.g., maximize or minimize) the objective functions to determine control or decision variables that result in the desired behavior of the flare 100.

The optimizer 1126 is configured to provide detailed optimization results to the user input manager 1130 for display on the user interface 1132 (e.g., so that the user can view how the flare 100 or multiple of the flares 100 are to be operated to achieve the desired goal), and is configured to provide control decisions to the flare 100 or equipment thereof to operate the flare 100 according to the control or decision variables. In some embodiments, the flare 100 uses the control decisions that are determined by performing the optimization to operate over the future time frame. Further, the optimization techniques described herein may be mathematically based as opposed to a subject matter expert (SME) approach.

Discrete Optimizations

Figure 8:
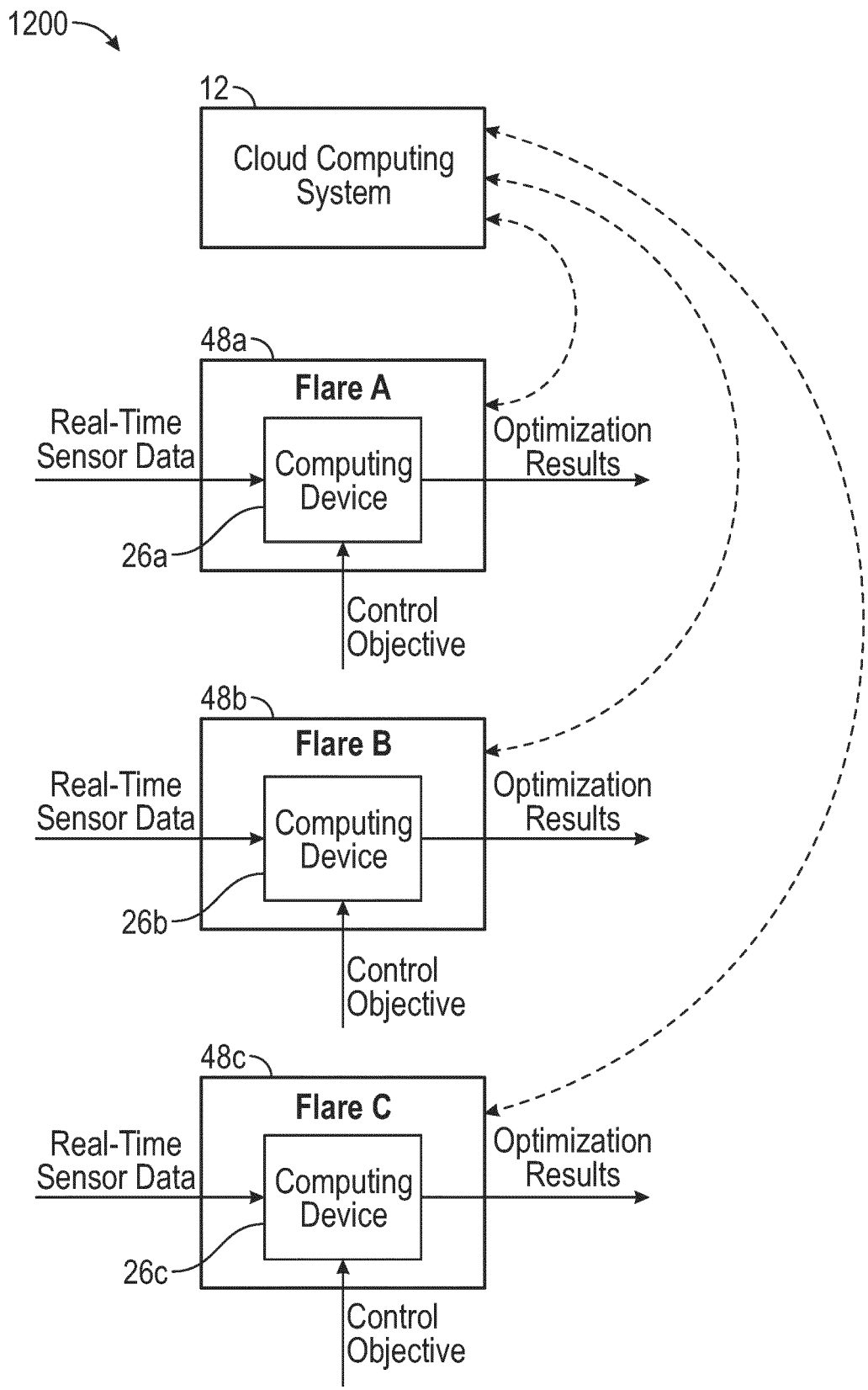
FIG. 8 illustrates a block diagram of a cloud computing system in communication with controllers of multiple flares, each of the controllers configured to perform an independent optimization, according to some embodiments.

Referring particularly to FIG. 8, a block diagram 1200 of a discrete optimization system for multiple of the flares 100a-100c is shown, according to some embodiments. In some embodiments, each of the flares 100a-100c includes a RTU 46. In some embodiments, the first of the flares 100a is configured to use the RTU 46a to perform an optimization for itself using real-time sensor data and/or a user input indicating a desired optimization mode. Similarly, the second of the flares 100b and the third of the flares 100c can use corresponding RTUs 46b and 46c to perform optimizations for themselves based on real-time sensor data and user inputs indicating desired optimization modes. In this way, the optimizations can be performed locally at each of multiple of the flares 100a-100c to determine optimization results and/or control decisions for the equipment of multiple of the flares 100a-100c. In some embodiments, the optimizations are performed autonomously at each of multiple of the flares 100a-100c to facilitate autonomous optimal operation of each of multiple of the flares 100a-100c. In other embodiments, the discrete optimization system for multiple of the flares 100 may include a different number of the flares 100 (e.g., two, four, five, etc.).

In some embodiments, the cloud-based computing system 12 is configured to obtain data from any of multiple of the flares 100a-100c to perform an overall optimization for multiple of the flares 100a-100c in a coordinated manner when the flares 100a-100c are interconnected (e.g., waste gas may be distributed across the flares 100a-100c, etc.). In some embodiments, the cloud-based computing system 12 is configured to use any of the functionality of the RTU 46 to perform an overall optimization of multiple of the flares 100a-100c. In this way, the optimization techniques as described in greater detail above with reference to FIG. 7 can be implemented locally at each flares 100a-100c to optimize operation of each flares 100a-100c or can be implemented on the cloud-based computing system 12 globally for multiple of the flares 100a-100c to determine an optimal operation of multiple of the flares 100a-100c. In some embodiments, an overall optimization of multiple of the flares 100a-100c is performed in a distributed manner among the RTUs 46a-46c of the flares 100a-100c, with the RTUs 46a-46c in communication with each other. In some embodiments, an overall optimization is performed (either at cloud-based computing system 12 or distributed among RTUs 46a-46c) and if communications disruptions are detected, the RTUs 46a-46c default to performing individual optimizations for each of the flares 100a-100c.

High Level Optimization Processes

Figure 9:
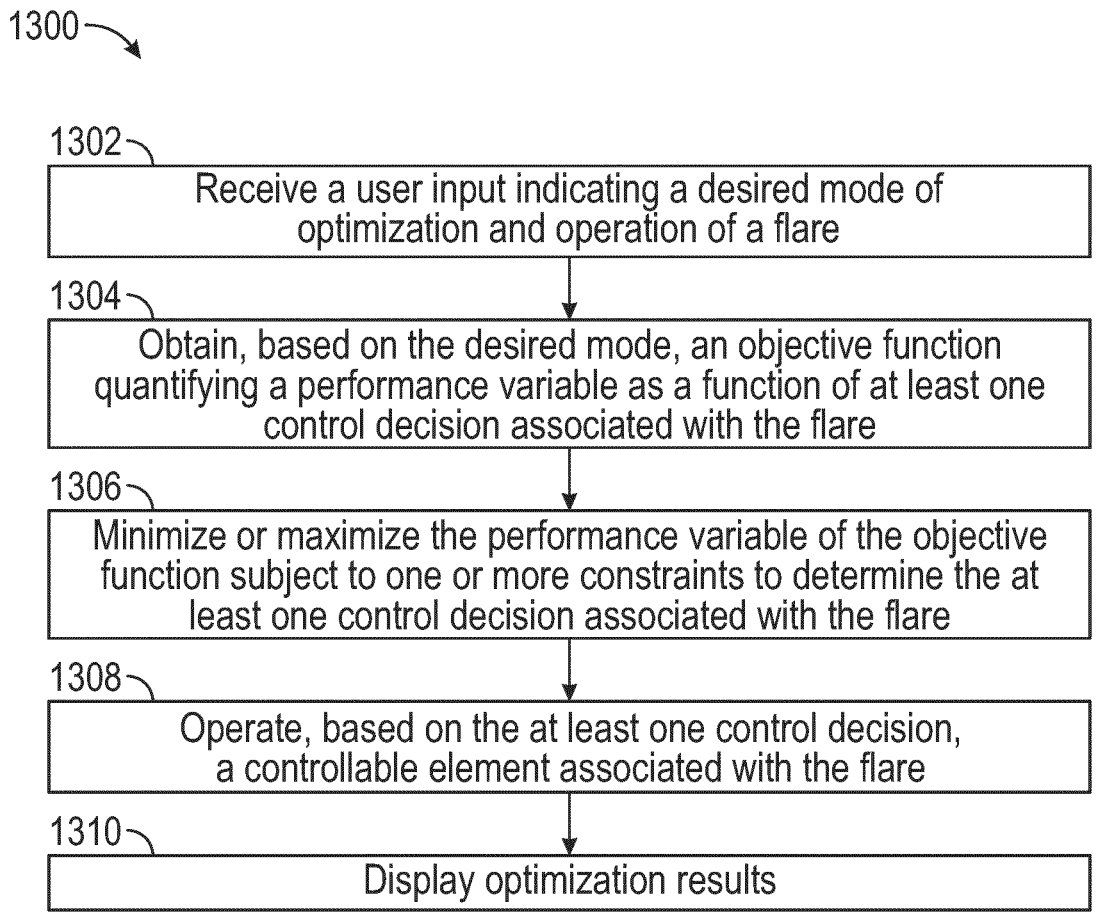
FIG. 9 illustrates a flow diagram of a process for selecting optimization schemes for a flare or multiple flares, according to some embodiments.

Referring particularly to FIG. 9, a process 1300 for optimizing operation of a flare using modeling is shown, according to some embodiments. Process 1300 includes operations 1302-1310 and can be performed by the computing device 26, the computing devices 26a-26c, or the cloud-based computing system 12 as described in greater detail above. In some embodiments, the process 1300 may be for optimizing operation of multiple flares using modeling.

Process 1300 includes receiving a user input indicating a desired mode of optimization and operation of a flare (operation 1302), according to some embodiments. For example, the user input may indicate that the desired mode of optimization and operation of the flare 100 is to minimize the emissions of the flare 100. In some embodiments, the user input may indicate a desired more of operation and operation of multiple of the flares 100. For example, the user input may indicate that the desired mode of optimization and operation of the multiple of the flares 100 is to minimize the methane emissions of the multiple of the flares 100. In various embodiments, the operation 1302 includes receiving an input indicating whether the process 1300 should be performed to optimize and operate according to emission costs associated with the emissions of the flare 100 or multiple of the flares 100.

Process 1300 includes obtaining an objective function that quantifies a performance variable as a function of control decisions of the flare (operation 1304), according to some embodiments. The objective function may be obtained based on the desired mode of optimization and operation received during operation 1302. In some embodiments, the objective function quantifies a performance variable as a function of control decisions of multiple flares. In some embodiments, the objective function forecasts the performance variable as a function of the control decisions of the flares 100 over a future time frame by utilizing flare combustion modeling, future weather forecasts, planned operational conditions, etc. In some embodiments, the performance variable is emission costs associated with emissions of the flare. In some embodiments, operation 1304 is performed by incorporating the methods utilized in system 400 to determine the emission costs associated with the emissions of the flare 100. In some embodiments, the objective function that quantifies the performance variable is a function of control decisions of the flare 100 (e.g., decision to increase or decrease flow rate of waste gas into the flare 100, decision to increase or decrease the flow rate of fuel gas into the flare 100, decision to increase or decrease the flow rate of steam proximate the nozzle 106 of the flare 100, decision to increase or decrease the flow rate of air into the flare 100, etc.). In various embodiments, the objective function forecasts the performance variable as a function of the control decisions of multiple of the flares 100 over the future time frame.

Process 1300 includes minimizing or maximizing the performance variable of the objective function subject to one or more constraints to determine at least one control decision associated with the flare (operation 1306), according to some embodiments. In some embodiments, operation 1306 includes minimizing or maximizing the performance variable of the objective function to one or more constraints to determine at least one control decision for the controllable elements associated with the flare 100. In some embodiments, operation 1306 includes minimizing or maximizing the performance variable by varying or adjusting values of the control decisions for the flare over the future time frame. In some embodiments, the constraints include limits on different control decisions, internal parameters, parameters of the compressors (e.g., max operational flow rate, etc.), planned maintenance (etc., a planned maintenance event on a flare taking the flare out of operation for a portion of the future time frame, etc.), etc. In various embodiments, the constraints include limits on control decisions over the future time frame (e.g., restricting the parameters of the flares over the future time frame to increase the reliability of the flares, maximum quantities of allowable flaring over the future time frame, restrictions on flaring during a specific portion of the future time frame, etc.). In some embodiments, operation 1306 is performed to determine control decisions that result in minimum or maximum of the performance variable over the future time frame (e.g., control decision to run a flare during a forecasted period of cooler weather, control decision to avoid running a flare during a forecasted period of rain, etc.). In various embodiments, operation 1306 includes varying or adjusting values of the control decisions of multiple of the flares 100 over the future time frame.

Process 1300 includes operating a controllable element associated with the flare (operation 1308), according to some embodiments. In some embodiments, the controllable element is operated based on the at least one control decisions associated with the flare determined during operation 1308. In some embodiments, operation 1308 includes adjusting various control parameters of the controllable elements associated with the flare 100 according to the control decisions. In some embodiments, operation 1308 includes providing the control decisions to the controllable elements associated with the flare 100 (e.g., flow rate of the waste gas, flow rate of the air, flow rate of the steam, flow rate of the fuel gas, diameter of the nozzle 106, etc.) to operate the controllable elements associated with the flare 100 according to the control decisions. In some embodiments, operation 1308 includes operating the controllable elements associated with the flare 100 over portions of the future time frame according to the control decisions (e.g., flaring during periods of reduced ambient temperature to increase the combustion efficiency of the flare 100, avoiding flaring during periods of rain to avoid decreases in the combustion efficiency of the flare 100, etc.). In various embodiments, operation 1308 includes adjusting various control parameters of multiple of the flares 48 according to the control decisions. For example, the control decision may be to utilize the flare 100 with a smaller diameter of the nozzle 106 over a longer period of time with a higher combustion efficiency to reduce the emission cost compared to utilizing the flare 100 with a larger diameter of the nozzle 106 over a shorter period of time.

In some embodiments, operation 1310 includes operating controllable elements associated with multiple flares. For example, operation 1310 may include operating the air controllable elements 132 associated with a first of the flares 100 and operating the waste gas controllable element 122 associated with a second of the flares 100. As another example, operation 1310 may include operating the waste gas controllable element 122 associated with a first of the flares 100 to provide a first amount of the waste gas to the first of the flares 100 over the future time frame and operating the waste gas controllable element 122 associated with a second of the flares 100 to provide a second amount of the waste gas to the second of the flares 100 over the future time frame.

Process 1300 includes displaying optimization results (operation 1310), according to some embodiments. In some embodiments, operation 1310 includes operating the display device to provide display data associated with optimization results of operation 1306 and/or operation 1308. For example, the optimization results of operation 1306 may include the at least one control decision associated with the flare and/or the one or more constraints related to the objective function. As another example, the optimization results of operation 1308 may include information associated with the operation of the controllable element associated with the flare. In some embodiments, the display device is any of the computing devices 26 (FIG. 1). In some embodiments, the display device is configured to access the display data via a server or a webpage. In some embodiments, operation 1310 may include operating alarms and/or alerts if minimum or maximum performance variable is above or below a predetermined threshold.

Figure 10:
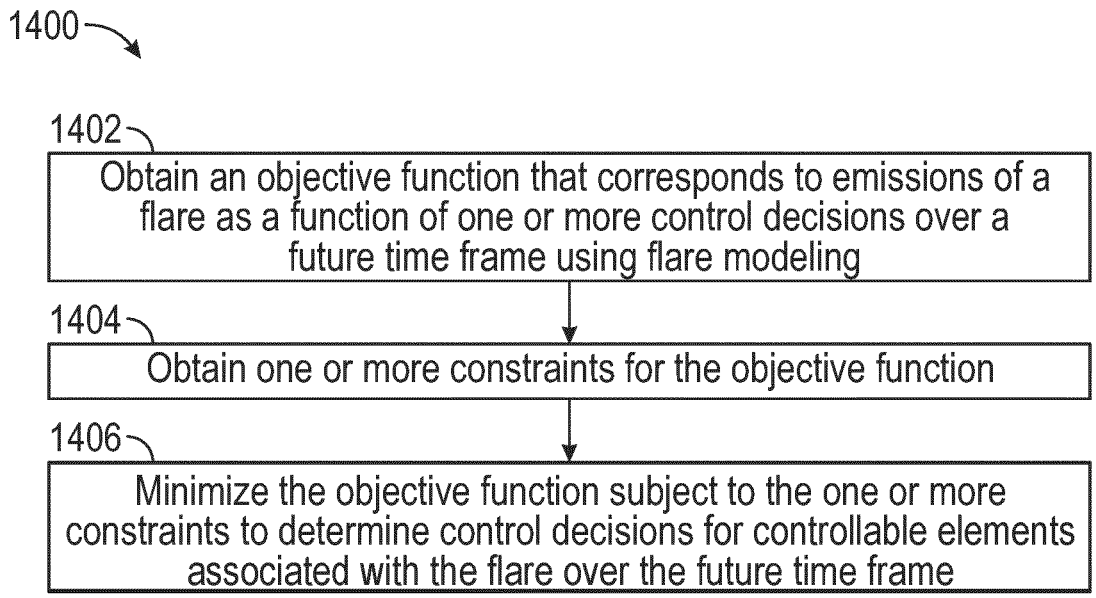
FIG. 10 illustrates a flow diagram of a process for optimizing a flare or multiple flares to minimize emission costs of the flare or the multiple flares, according to some embodiments.

Referring particularly to FIG. 10, a process 1400 for performing an optimization of emissions of a flare over a future time frame is shown, according to some embodiments. Process 1400 includes operations 1402-1406 and can be performed by the objective function generator 1118 and the optimizer 1126 as described in greater detail above with reference to FIG. 7. In some embodiments, process 1400 is performed to determined how to operate the flare 100 over the future time frame that results in the lowest emission cost associated with the emissions of the flare 100 over the future time frame. In various embodiments, process 1400 is performed to determine how to operate multiple of the flares 100 over the future time frame that results in the lowest emission cost associated with the emission of the multiple of the flares 100 over the future time frame. In some embodiments, process 1400 is performed as operations 1304-1306 of process 1300.

Process 1400 includes obtaining an objective function that corresponds to emissions of a flare as a function of one or more control decisions over a future time frame using flare modeling (operation 1402), according to some embodiments. In some embodiments, the objective function corresponds to emission costs associated with emissions of the flare as a function of one more control decisions over the future time frame. In some embodiments, operation 1402 includes defining an objective function that expresses emission cost associated with emissions caused by operation of the flare 100 summed over the future time frame. The emission cost can be determined utilizing the system 400 described in more detail above. In some embodiments, the utilization of the system 400 may include utilizing the model of the flare to define the objective function that defines emission costs associated with the emissions of the flare 100 as the function of the one or more control decisions over the future time frame In some embodiments, operation 1402 includes obtaining an objective function that corresponds to emissions of multiple of the flares as a function of one or more control decisions associated with the multiple of the flares over the future time frame using flare modeling of each of the multiple of the flares. For example, operation 1402 may include obtaining an objective function that corresponds to emissions of a first of the flares 100 and a second of the flares 100 as a function of one or more control decisions associated with first controllable elements associated with the first of the flares 100 over the future time frame and second controllable elements associated with the second of the flares 100 over the future time frame.

Process 1400 includes obtaining one or more constraints for the objective function (operation 1404), according to some embodiments. In some embodiments, operation 1404 includes defining, generating or otherwise obtaining the one or more constraints for the objective function. In some embodiments, the constraints include limits on operability of controllable elements associated with the flares 100, limits on the amount of flaring that can be performed, etc. In some embodiments, the constraints include limits intended to increase the reliability of components of the flares 100 (e.g., decreasing the flow rate through the nozzle 106 to increase the performance life of the nozzle, etc.) and/or components associated with the flare 100 (e.g., a maximum performance pressure of the waste gas source 120, etc.). In some embodiments, the constraints are additional equations or conditions that must be met in order for the solution to be viable or realistically achievable. In some embodiments, operation 1404 is performed by the objective function generator 1118 or the optimizer 1126.

Process 1400 includes minimizing the objective function subject to the one or more constraints to determine control decisions for controllable elements associated with the flare over the future time frame (operation 1406), according to some embodiments. In some embodiments, operation 1406 includes performing a multi-variable optimization to determine control decisions for controllable elements associated with the flare that satisfy the one or more constraints and that result in a lowest or optimal emission cost associated with emissions that will be generated by the operation of the flare 100 over the future timeframe. In some embodiments, operation 1806 is performed by the optimizer 1126 based on the objective function obtained in operation 1804. In some embodiments, operation 1406 includes performing a multi-variable optimization to determine control decisions associated with the controllable elements associated with multiple of the flares 100 that satisfy the one or more constraints and that result in a lowest or optimal emission cost associated with emissions that will be caused by operation of multiple of the flares 100 over the future time frame.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein

What is claimed is:

1. A method for operating a flare, the method comprising:
   obtaining sensor data from at least one sensor of a sensing unit associated with the flare, the sensor data corresponding with at least one material received by the flare;
   obtaining environmental data corresponding with environmental conditions proximate the flare;
   modeling the sensor data and the environmental data to determine at least one measurement associated with emissions of the flare, wherein the at least one measurement is an emission cost measurement associated with the emissions of the flare, the emission cost measurement based on a carbon dioxide equivalent measurement of the emissions, the carbon dioxide equivalent measurement including carbon dioxide emissions of the flare and other emissions of the flare converted to carbon dioxide equivalents;
   determining, based on the at least one measurement, one or more control decisions for at least one controllable element associated with the flare to achieve a control objective for the flare, the control objective associated with the at least one measurement;
   generating display data corresponding to the one or more control decisions; and
   operating a display device to provide the display data to a user wherein the one or more control decisions are determined by:
      obtaining, from an operator of the flare, the control objective associated with the at least one measurement;
      obtaining an objective function that quantifies a performance variable corresponding with the at least one measurement as a function of control decisions for controllable elements associated with the flare, the objective function subject to the control objective; and
      determining, by minimizing or maximizing the performance variable of the objective function, the one or more control decisions for the at least one controllable element of the flare, wherein the one or more control decisions are determined by minimizing the performance variable corresponding to the emission cost measurement.

2. The method of claim 1, further comprising:
operating the at least one controllable element associated with the flare according to the one or more control decisions to meet the control objective.

3. The method of claim 2, wherein:
the control objective is associated with an emission threshold of the at least one measurement; and
the at least one controllable element is operated such that the at least one measurement does not exceed the emission threshold.

4. The method of claim 1, further comprising:
obtaining forecasted material data corresponding with the at least one material received by the flare over a future time frame;
obtaining forecasted environmental data corresponding with forecasted environmental conditions proximate the flare over the future time frame;
modeling the forecasted material data and the forecasted environmental data to determine the at least one measurement associated with the emissions of the flare during the future time frame;
determining one or more future control decisions for the at least one controllable element to achieve the control objective for the flare during the future time frame;
generating forecasted display data corresponding to the one or more future control decisions; and
operating a display device to provide the forecasted display data to the user.

5. The method of claim 1, wherein the objective function for the flare is generated by inputting the sensor data, the environmental data, the at least one measurement, and the control objective into a model of the flare.

6. The method of claim 1, further comprising:
obtaining forecasted material data corresponding with the at least one material received by the flare over a future time frame;
obtaining forecasted environmental data corresponding with forecasted environmental conditions proximate the flare over the future time frame;

wherein:
the objective function for the flare is generated by inputting the forecasted material data, the forecasted environmental data, and the control objective into a model of the flare;
the objective function quantifies the performance variable as the function of the control decisions for the controllable elements associated with the flare over the future time frame; and
the control objective is associated with a future emission threshold of the emissions of the flare over the future time frame.

7. The method of claim 6, further comprising:
operating the at least one controllable element of the flare according to the one or more control decisions over the future time frame such that the emissions of the flare over the future time frame do not exceed the future emission threshold.

8. The method of claim 1, wherein:
the flare is a first flare;
the sensor data corresponds with the at least one material received by the first flare and a second flare;
the environmental data corresponds with the environmental conditions proximate the first flare and the second flare;
the at least one measurement includes a first measurement associated with first emissions of the first flare and a second measurement associated with second emissions of the second flare; and
the one or more control decisions are for the at least one controllable element associated with the first flare and the second flare, the one or more control decisions including directing a first quantity of the at least one material to the first flare and a second quantity of the at least one material to the second flare to achieve a combined control objective for the first flare and the second flare associated with combined emissions of the first flare and the second flare.

9. A computing system configured to communicatively couple with a remote terminal unit (RTU) configured to monitor and/or control one or more operations of a flare associated with a hydrocarbon site, the computing system comprising:
a processor configured to:
obtain, from the RTU, sensor data from at least one sensor of a sensing unit associated with the flare, the sensor data corresponding with at least one material received by the flare;
obtain environmental data corresponding with environmental conditions proximate the flare;
model the sensor data and the environmental data to determine at least one measurement associated with emissions of the flare;
determine, based on the at least one measurement, one or more control decisions for at least one controllable element associated with the flare to achieve a control objective for the flare, the control objective associated with the at least one measurement;
generate display data corresponding to the one or more control decisions; and
operate a display device to provide the display data to a user;
obtain forecasted material data corresponding with the at least one material received by the flare over a future time frame; and
obtain forecasted environmental data corresponding with forecasted environmental conditions proximate the flare over the future time frame;
wherein the one or more control decisions are determined by:
obtaining, from an operator of the flare, the control objective associated with the at least one measurement;
obtaining an objective function that quantifies a performance variable corresponding with the at least one measurement as a function of control decisions for controllable elements associated with the flare, the objective function subject to the control objective; and
determining, by minimizing or maximizing the performance variable of the objective function, the one or more control decisions for the at least one controllable element of the flare;
wherein the objective function for the flare is generated by inputting the forecasted material data, the forecasted environmental data, and the control objective into a model of the flare;
wherein the objective function quantifies the performance variable as the function of the control decisions for the controllable elements associated with the flare over the future time frame; and
wherein the control objective is associated with a future emission threshold of the emissions of the flare over the future time frame.

10. The computing system of claim 9, wherein the processor is further configured to operate the at least one controllable element associated with the flare according to the one or more control decisions to meet the control objective.

11. The computing system of claim 9, wherein the processor is further configured to:
model the forecasted material data and the forecasted environmental data to determine the at least one measurement associated with the emissions of the flare during the future time frame;
determine one or more future control decisions for the at least one controllable element to achieve the control objective for the flare during the future time frame;
generate forecasted display data corresponding to the one or more future control decisions; and
operate a display device to provide the forecasted display data to the user.

12. The computing system of claim 9, wherein:
the control objective is associated with an emission threshold of the at least one measurement; and
the one or more control decisions will result in operation of the at least one controllable element such that the at least one measurement does not exceed the emission threshold.

13. The computing system of claim 9, wherein the processor is further configured to:
operate the at least one controllable element of the flare according to the one or more control decisions over the future time frame such that the emissions of the flare over the future time frame do not exceed the future emission threshold.

14. A method for operating a flare, the method comprising:
obtaining sensor data from at least one sensor of a sensing unit associated with the flare, the sensor data corresponding with at least one material received by the flare;

obtaining environmental data corresponding with environmental conditions proximate the flare;

modeling the sensor data and the environmental data to determine at least one measurement associated with emissions of the flare;

determining, based on the at least one measurement, one or more control decisions for at least one controllable element associated with the flare to achieve a control objective for the flare, the control objective associated with the at least one measurement;

generating display data corresponding to the one or more control decisions;

operating a display device to provide the display data to a user;

obtaining forecasted material data corresponding with the at least one material received by the flare over a future time frame;

obtaining forecasted environmental data corresponding with forecasted environmental conditions proximate the flare over the future time frame;

modeling the forecasted material data and the forecasted environmental data to determine the at least one measurement associated with the emissions of the flare during the future time frame;

determining one or more future control decisions for the at least one controllable element to achieve the control objective for the flare during the future time frame;

generating forecasted display data corresponding to the one or more future control decisions; and operating a display device to provide the forecasted display data to the user.

15. The method of claim 14, wherein the control objective is associated with a future emission threshold of the emissions of the flare over the future time frame.

16. The method of claim 15, further comprising operating the at least one controllable element of the flare according to the one or more control decisions over the future time frame such that the emissions of the flare over the future time frame do not exceed the future emission threshold.

17. The method of claim 14, wherein the at least one measurement is an emission cost measurement associated with the emissions of the flare, the emission cost measurement based on a carbon dioxide equivalent measurement of the emissions, the carbon dioxide equivalent measurement including carbon dioxide emissions of the flare and other emissions of the flare converted to carbon dioxide equivalents.

18. The method of claim 14, wherein:

the flare is a first flare;

the sensor data corresponds with the at least one material received by the first flare and a second flare;

the environmental data corresponds with the environmental conditions proximate the first flare and the second flare;

the at least one measurement includes a first measurement associated with first emissions of the first flare and a second measurement associated with second emissions of the second flare; and the one or more control decisions are for the at least one controllable element associated with the first flare and the second flare, the one or more control decisions including directing a first quantity of the at least one material to the first flare and a second quantity of the at least one material to the second flare to achieve a combined control objective for the first flare and the second flare associated with combined emissions of the first flare and the second flare.

19. The method of claim 14, further comprising:

operating the at least one controllable element associated with the flare according to the one or more control decisions to meet the control objective.

20. The method of claim 14, wherein the one or more control decisions are determined by:

obtaining, from an operator of the flare, the control objective associated with the at least one measurement;

obtaining an objective function that quantifies a performance variable corresponding with the at least one measurement as a function of control decisions for controllable elements associated with the flare, the objective function subject to the control objective; and determining, by minimizing or maximizing the performance variable of the objective function, the one or more control decisions for the at least one controllable element of the flare.

* * * * *